United States Patent
White

(10) Patent No.: US 9,528,810 B1
(45) Date of Patent: Dec. 27, 2016

(54) METHOD FOR STABILIZING A TOOL RELATIVE TO A SURFACE

(71) Applicant: The Boeing Company, Chicago, IL (US)

(72) Inventor: Scott Michael White, Fox Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 382 days.

(21) Appl. No.: 14/044,221

(22) Filed: Oct. 2, 2013

(51) Int. Cl.
G01B 3/22 (2006.01)
G01B 3/28 (2006.01)
G01B 3/56 (2006.01)

(52) U.S. Cl.
CPC . *G01B 3/28* (2013.01); *G01B 3/22* (2013.01); *G01B 3/56* (2013.01)

(58) Field of Classification Search
CPC .............. G01B 3/22; G01B 3/28; G01B 3/56; G01B 5/18; G01B 5/20; G01B 5/24; G01B 5/245
USPC ................... 33/533, 534, 535, 833; 73/104
See application file for complete search history.

(56) References Cited

U.S. PATENT DOCUMENTS

| | | | | |
|---|---|---|---|---|
| 2,959,864 A * | 11/1960 | Webb | ............... | G01B 5/243 33/833 |
| 2,975,524 A * | 3/1961 | Field | ............... | G01B 3/56 33/534 |
| 3,271,871 A * | 9/1966 | Foscarota | ............... | G01B 5/245 33/474 |
| 3,848,339 A * | 11/1974 | Strasbaugh | ............ | G01B 5/213 33/507 |
| 4,132,001 A * | 1/1979 | Petrik | ............... | G01B 5/08 33/501.45 |
| 4,336,656 A * | 6/1982 | Lewis | ............... | G01B 5/24 33/532 |
| 4,434,559 A * | 3/1984 | Lauer | ............... | G01B 5/00 33/534 |
| 5,205,046 A | 4/1993 | Barnett et al. | | |
| 5,235,988 A | 8/1993 | Johnson et al. | | |
| 5,471,762 A | 12/1995 | Miller et al. | | |
| 6,662,456 B1 | 12/2003 | Triplett | | |
| 7,428,783 B2 | 9/2008 | Li et al. | | |
| 7,562,593 B2 * | 7/2009 | Engelbart | ............ | G01B 5/0004 73/866.5 |
| 7,762,005 B2 | 7/2010 | Pelotte | | |
| 2007/0022620 A1 * | 2/2007 | Batora | ............... | G01B 3/28 33/836 |

FOREIGN PATENT DOCUMENTS

JP 60-179602 * 9/1985
WO 2006006445 A1 6/2006

OTHER PUBLICATIONS

"Digital Pit Depth Gauge," Weblink.In Pvt. Ltd., Jun. 2011, 2 pages, accessed May 30, 2013. http://www.exportersindia.com/caltechengineeringservices/prodcuts.html.

* cited by examiner

*Primary Examiner* — Daniel S Larkin
(74) *Attorney, Agent, or Firm* — Yee & Associates, P.C.

(57) ABSTRACT

A method and apparatus for inspecting a surface. A type of the surface to be inspected may be identified. A stability device may be selected from a set of stability devices in a tool kit for use in stabilizing a tool relative to the type of surface identified. The tool may be stabilized relative to the surface using a stabilizing feature of the stability device selected. The surface may be inspected using the tool.

25 Claims, 25 Drawing Sheets

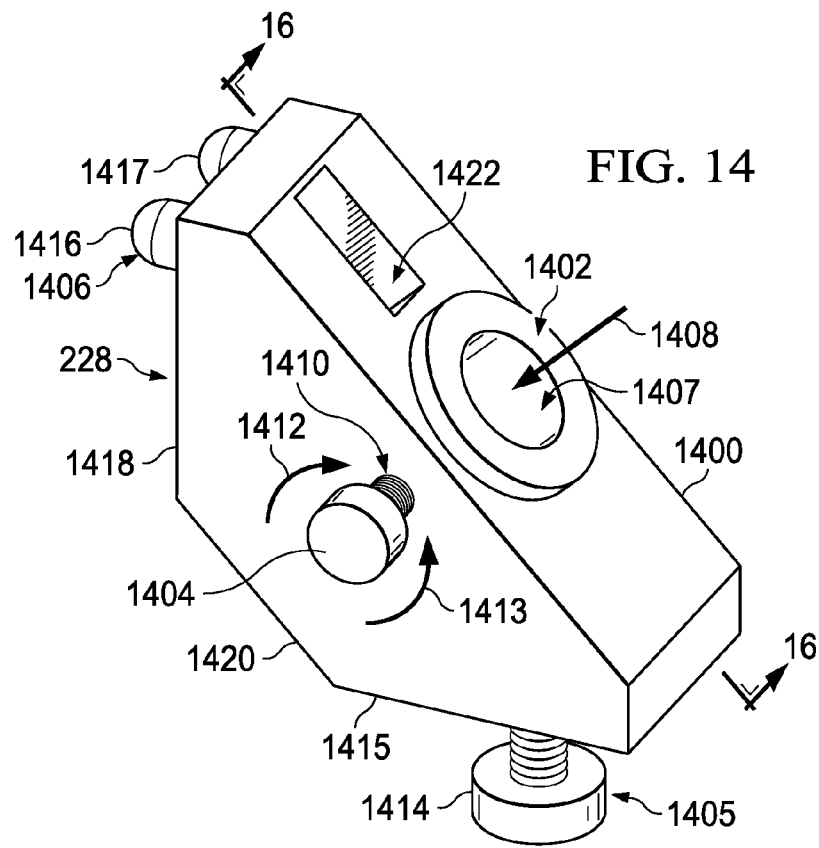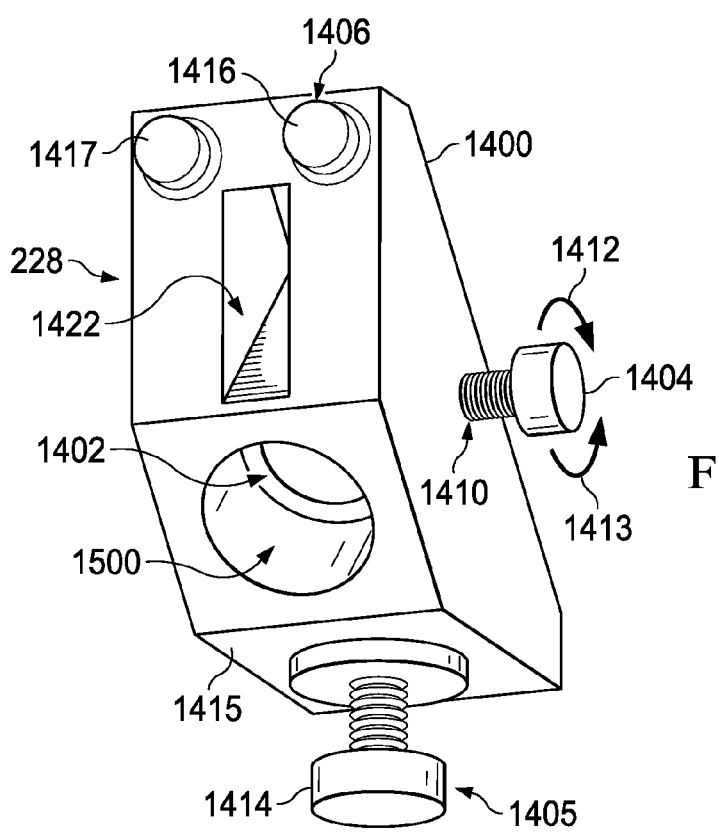

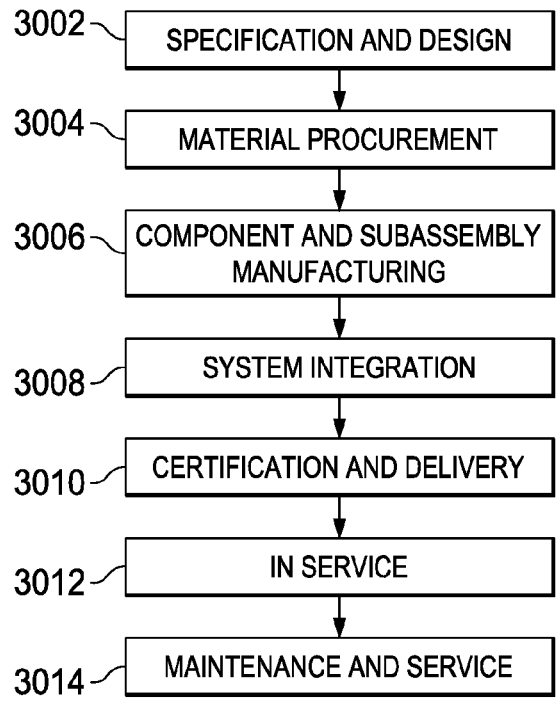
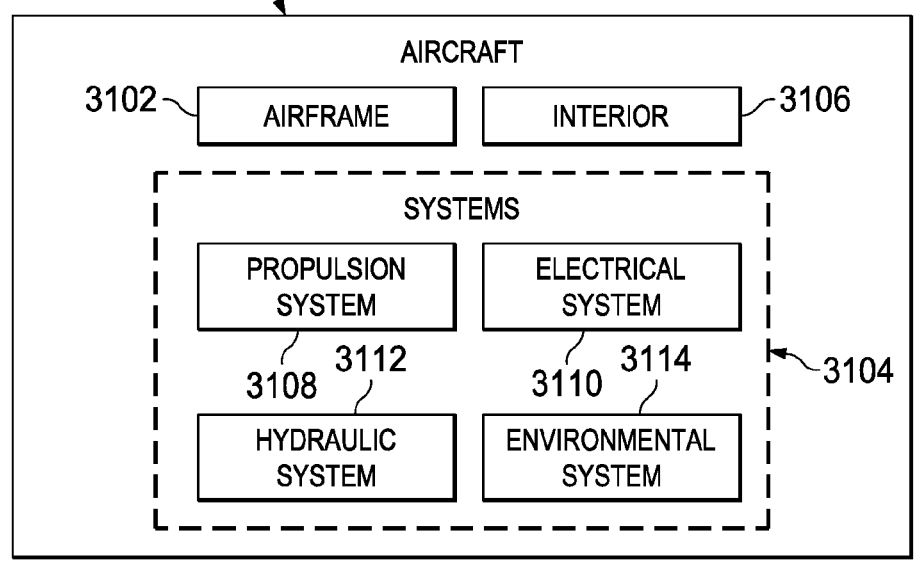

METHOD FOR STABILIZING A TOOL RELATIVE TO A SURFACE

BACKGROUND INFORMATION

Field

The present disclosure relates generally to stability devices for tools and a kit for holding these stability devices. More particularly, the present disclosure relates to a method and apparatus for stabilizing a tool relative to the surface of an object.

Background

During manufacturing, parts may need to be inspected to ensure that the parts do not have any undesired inconsistencies. As used herein, an "undesired inconsistency" may be an inconsistency that is outside of selected tolerances. The inconsistency may take the form of, for example, without limitation, a mark left by a tool, a misalignment, an incomplete fairing of material, a wrinkle, a scratch, some other type of inconsistency, or a combination thereof.

Various tools may be used to inspect a part to ensure that the part does not have any undesired inconsistencies. These tools may include, but are not limited to, ultrasonic testing devices, laser devices, depth gauges, and/or other types of inspection tools.

Typically, a laser device and/or depth gauge may be used to inspect the surface of a part. However, some currently available laser devices may be more expensive and/or bulkier than desired. These laser devices may not be suitable for inspecting surfaces within restricted areas, enclosed spaces, and/or small spaces. Additionally, laser devices may not be suitable for inspecting parts having surfaces that were treated with potentially flammable chemicals.

Consequently, depth gauges may be used to inspect surfaces within restricted areas, enclosed spaces, and/or small spaces and surfaces that have been treated with potentially flammable chemicals. However, some currently available depth gauges may only provide accurate measurements when measurements are made on a substantially flat or only slightly contoured surface.

A typical depth gauge may have a probe shaft that may be moved across a surface to measure depth changes in the surface. However, when the tip of the probe shaft reaches an edge of a part or a complex contour, such as a curved corner, the probe shaft may rotate and/or tilt. Rotation and/or tilting of the probe shaft may result in inaccurate measurements. Further, aligning the tip of the probe shaft with corners may be more difficult than desired. For example, without limitation, aligning the tip with an interior corner, such as a fillet, or an exterior corner may be more difficult than desired. Therefore, it would be desirable to have a method and apparatus that take into account at least some of the issues discussed above, as well as other possible issues.

SUMMARY

In one illustrative embodiment, an apparatus may comprise a base, a retaining structure associated with the base, and a stabilizing feature associated with the base. The base may be configured for placement over a surface. The retaining structure may be configured to receive a tool. The stabilizing feature may be configured to stabilize the base and the tool relative to the surface.

In another illustrative embodiment, a tool kit may comprise a set of stability devices and a holder. Each stability device in the set of stability devices may be configured for use in stabilizing a tool relative to a different type of surface. The holder may be configured to hold the set of stability devices.

In another illustrative embodiment, a tool kit may comprise a holder. The holder may be configured to hold a plurality of components. The plurality of components may comprise a set of tools, a set of tips for the set of tools, and a set of stability devices for use with the set of tools. The set of stability devices may comprise a first stability device, a second stability device, a third stability device, and a fourth stability device. The first stability device may be configured for use in holding and stabilizing a tool in the set of tools relative to one of a surface near an edge or an edge surface of the edge. The second stability device may be configured for use in holding and stabilizing a tool in the set of tools relative to multi-level surface. The third stability device may be configured for use in holding and stabilizing a tool in the set of tools relative to an interior corner. The fourth stability device may be configured for use in holding and stabilizing a tool in the set of tools relative to an exterior corner and a curved surface.

In yet another illustrative embodiment, a method for inspecting a surface may be provided. A type of the surface to be inspected may be identified. A stability device may be selected from a set of stability devices in a tool kit for use in stabilizing a tool relative to the type of surface identified. The tool may be stabilized relative to the surface using a stabilizing feature of the stability device selected. The surface may be inspected using the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a top isometric view of a third stability device in accordance with an illustrative embodiment;

FIG. 15 is an illustration of a bottom isometric view of a third stability device in accordance with an illustrative embodiment;

FIG. 30 is an illustration of an aircraft manufacturing and service method in the form of a block diagram in accordance with an illustrative embodiment; and FIG. 31 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have different types of devices capable of stabilizing the position and/or orientation of a tool relative to different types of surfaces. Further, the illustrative embodiments recognize and take into account that it may be desirable to have a kit configured to hold these different devices.

Figure 1:
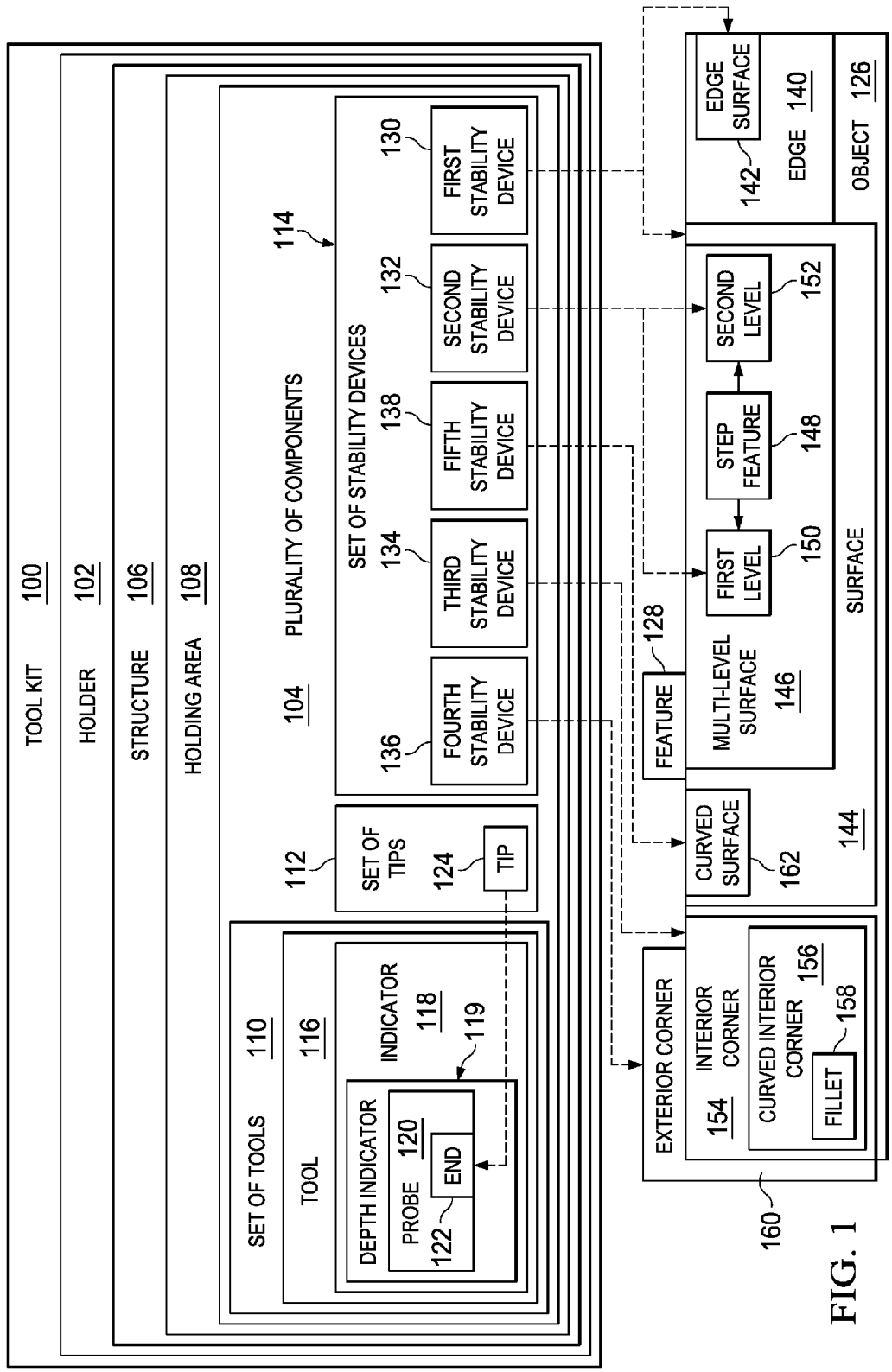
FIG. 1 is an illustration of a tool kit in the form of a block diagram in accordance with an illustrative embodiment.

Referring now to the figures and, in particular, with reference to FIG. 1, an illustration of a tool kit is depicted in the form of a block diagram in accordance with an illustrative embodiment. In this illustrative example, tool kit 100 may include holder 102 configured to hold plurality of components 104. Holder 102 may include structure 106 having holding area 108 for holding plurality of components 104.

In this illustrative example, plurality of components 104 may include set of tools 110, set of tips 112, set of stability devices 114, and/or other types of components. As used herein, a "set of" items may include one or more items. In this manner, set of tools 110 may include one or more tools. Further, set of tips 112 may include one or more tips.

Tool 116 may be an example of one of set of tools 110. In one illustrative example, tool 116 may take the form of indicator 118. Indicator 118 may be used to generate measurements. Indicator 118 may be, for example, without limitation, depth indicator 119. Depth indicator 119 may take the form of a dial indicator depth gauge configured to generate depth measurement.

As depicted, indicator 118 may include probe 120 with end 122. Set of tips 112 may be configured for attachment to end 122. For example, without limitation, each tip in set of tips 112 may be removably attached to end 122 of probe 120 and used for generating depth measurements. Tip 124 may be an example of one of set of tips 112 that may be used with indicator 118.

In this illustrative example, indicator 118 with tip 124 attached to indicator 118 may be used to inspect object 126 and/or feature 128 located on object 126. Feature 128 may take the form of, for example, without limitation, a fastener head, a fastener element, a raised edge, a groove, an indentation, or some other type of feature. Set of stability devices 114 may be used to stabilize probe 120 relative to object 126 and/or feature 128. Stabilizing probe 120 may include fixing the position and/or orientation of probe 120 relative to surface 144 of object 126. Surface 144 may be a curved surface, a substantially planar surface, an edge surface, a continuous surface, a discontinuous surface, a surface formed by multiple surfaces connected to each other, and/or some other type of surface.

Set of stability devices 114 may include first stability device 130, second stability device 132, third stability device 134, fourth stability device 136, fifth stability device 138, and/or some other type of stability device. Each of these stability devices may be used to stabilize probe 120 relative to a different type of surface 144 of object 126. First stability device 130, second stability device 132, third stability device 134, and fourth stability device 136 may be configured for use in stabilizing probe 120 relative to surface 144 when surface 144 is not substantially planar.

First stability device 130 may be used to stabilize probe 120 relative to surface 144 of object 126 at or near edge 140 of object 126 and/or relative to edge surface 142 of edge 140. In particular, first stability device 130 may be configured such that tip 124 attached to probe 120 may be moved along surface 144 of object 126 up to edge 140 and/or along edge surface 142 of edge 140.

Second stability device 132 may be used to stabilize probe 120 relative to surface 144 when surface 144 takes the form of multi-level surface 146. Multi-level surface 146 may include, for example, without limitation, first level 150 and second level 152 separated by step feature 148. Second stability device 132 may allow tip 124 attached to probe 120 to be moved along second level 152 of multi-level surface 146 even when second level 152 may not be large enough to accommodate second stability device 132. In particular, a portion of second stability device 132 may be positioned over first level 150 of multi-level surface 146, while another portion of second stability device 132 may stabilize probe 120 with tip 124 over second level 152 of multi-level surface 146.

Third stability device 134 may be used to stabilize probe 120 relative to interior corner 154 of object 126. In one illustrative example, interior corner 154 may take the form of curved interior corner 156. For example, without limitation, curved interior corner 156 may be fillet 158. Third stability device 134 may be used to stabilize probe 120 and tip 124 relative to fillet 158 such that measurements along fillet 158 may be made.

Fourth stability device 136 may be used to stabilize probe 120 relative to exterior corner 160 of object 126. Exterior corner 160 may have a number of different shapes. In one illustrative example, exterior corner 160 may be a right angle corner. In another illustrative example, exterior corner 160 may be a curved exterior corner.

Fourth stability device 136 may also be used to stabilize probe 120 relative to surface 144 when at least a portion of surface 144 is curved surface 162. For example, without limitation, fourth stability device 136 may also be used to stabilize probe 120 relative to surface 144 when object 126 takes the form of a spherical object, a cylindrical object, or some other type of object having curved surface 162.

Fifth stability device 138 may be configured for stabilizing probe 120 relative to surface 144 when surface 144 is substantially planar, or substantially flat. In some cases, fifth stability device 138 may be used to stabilize probe 120 relative to surface 144 when the contour of surface 144 does not vary outside of selected tolerances.

Examples of the different ways in which the stability devices in set of stability devices 114 may be implemented are depicted in FIG. 2 and FIGS. 4-28 below. An example of one manner in which indicator 118 may be implemented is depicted in FIGS. 2-3.

The illustration of tool kit 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
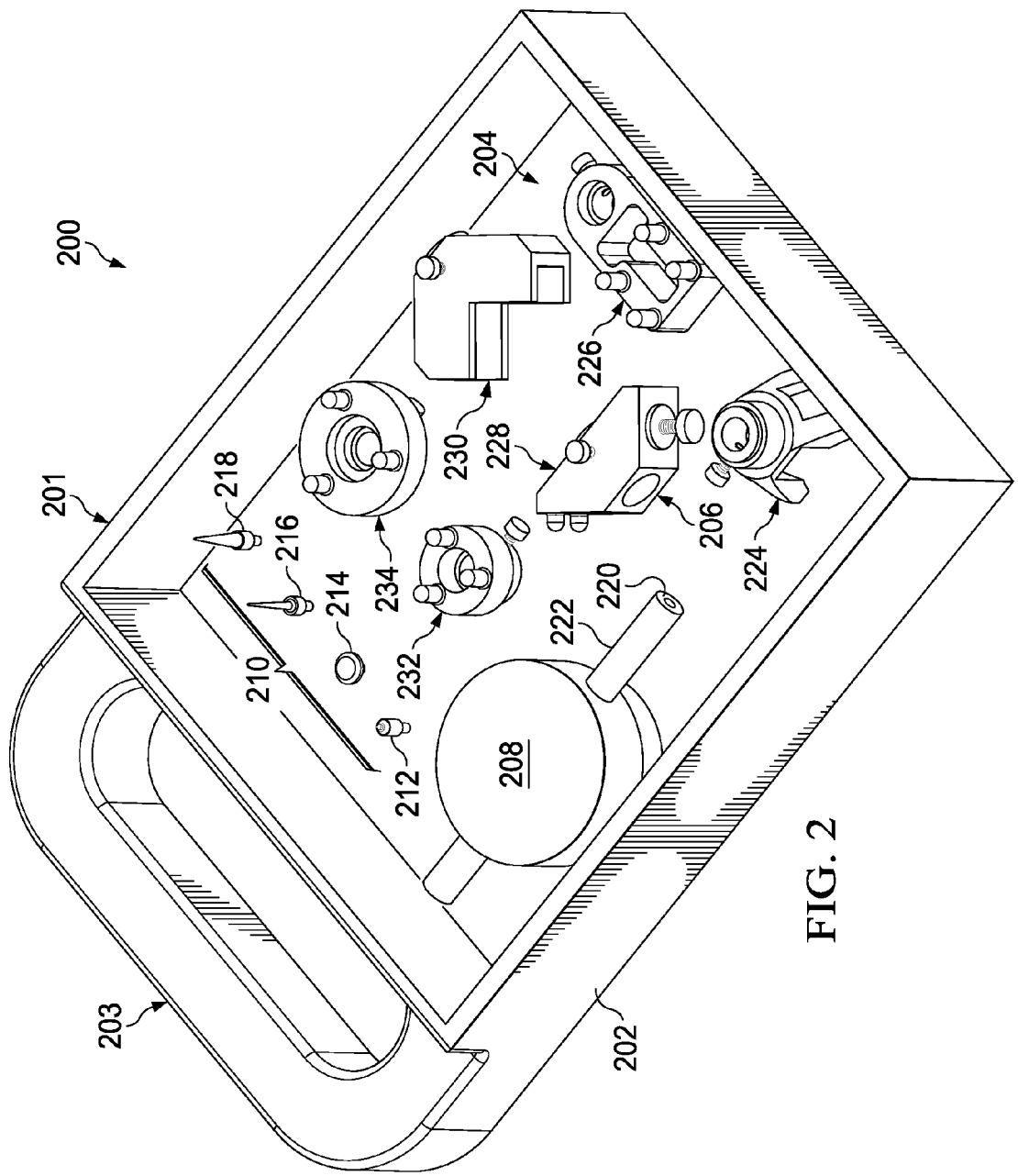
FIG. 2 is an illustration of an isometric view of a tool kit in accordance with an illustrative embodiment.
Figure 3:
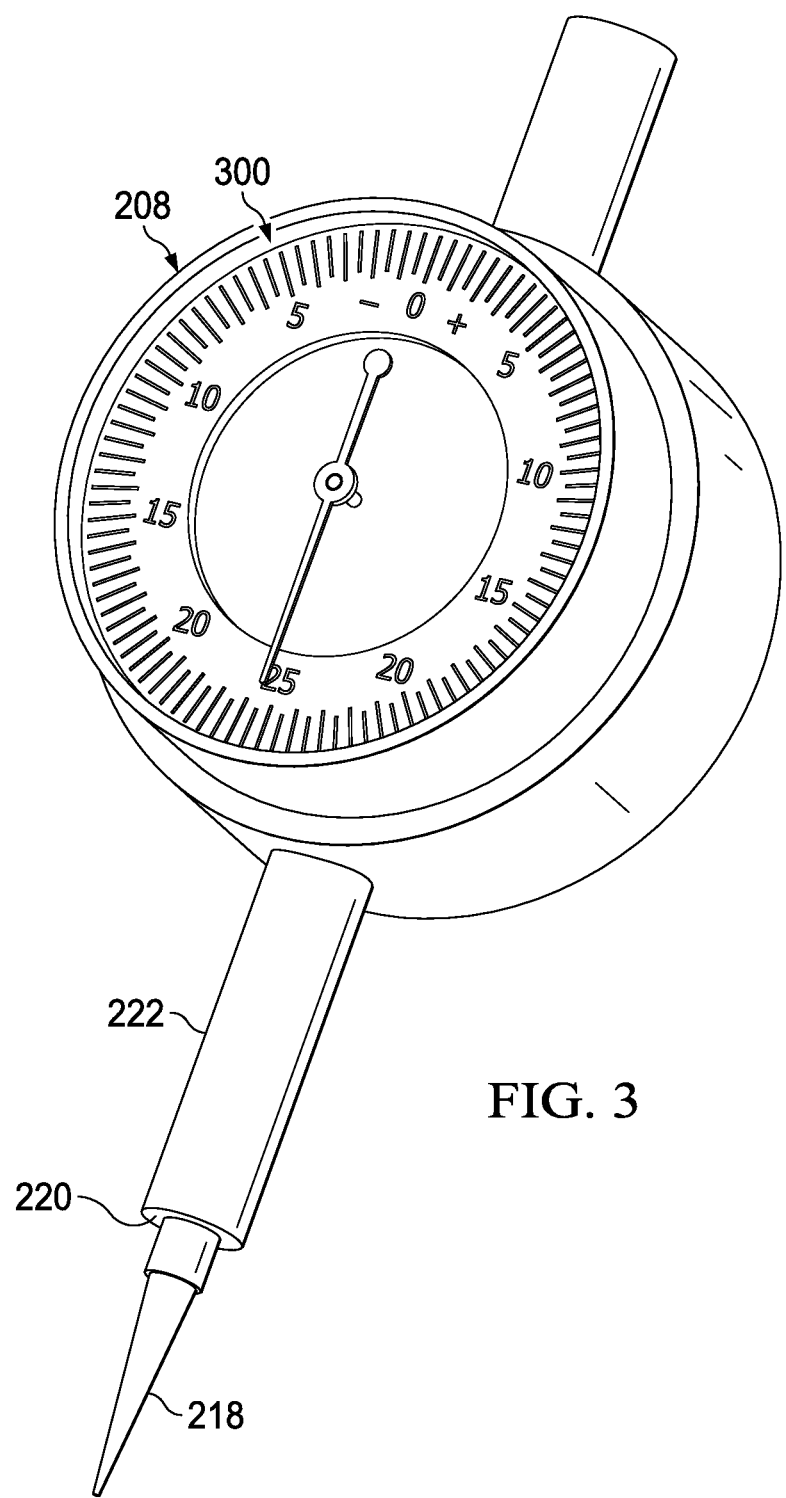
FIG. 3 is an illustration of an isometric view of a tip attached to an indicator in accordance with an illustrative embodiment.

With reference now to FIG. 2, an illustration of an isometric view of a tool kit is depicted in accordance with an illustrative embodiment. In this illustrative example, tool kit 200 may be an example of one implementation for tool kit 100 in FIG. 1. As depicted, tool kit 200 may include holder 201. Holder 201 may be an example of one implementation for holder 102 in FIG. 1.

Holder 201 may include structure 202 and handle 203. Structure 202 may have holding area 204 configured to hold plurality of components 206. Structure 202, holding area 204, and plurality of components 206 may be examples of implementations for structure 106, holding area 108, and plurality of components 104, respectively, in FIG. 1.

In this illustrative example, plurality of components 206 may include indicator 208. Indicator 208 may be an example of one implementation for indicator 118 in FIG. 1. In this illustrative example, indicator 208 may be a depth indicator, such as depth indicator 119 in FIG. 1.

Plurality of components 206 may also include set of tips 210, which may be an example of one implementation for set of tips 112 in FIG. 1. Set of tips 210 may include tips 212, 214, 216, and 218. Each of these tips may be configured for attachment to end 220 of probe 222 of indicator 208.

Plurality of components 206 may also include first stability device 224, second stability device 226, third stability device 228, fourth stability device 230, fifth stability device 232, and sixth stability device 234. Each of these stability devices may be used to stabilize probe 222 of indicator 208 relative to the surface (not shown) of an object (not shown).

First stability device 224, second stability device 226, third stability device 228, and fourth stability device 230 may be examples of implementations for first stability device 130, second stability device 132, third stability device 134, and fourth stability device 136, respectively, from FIG. 1. Fifth stability device 232 and sixth stability device 234 may both be examples of implementations for fifth stability device 138 in FIG. 1.

Turning now to FIG. 3, an illustration of an isometric view of tip 218 from FIG. 2 attached to indicator 208 from FIG. 2 is depicted in accordance with an illustrative embodiment. As depicted, tip 218 has been attached to probe 222 of indicator 208. Indicator 208 may have dial 300. Dial 300 may be used to indicate depth measurements read using tip 218.

Figure 4:
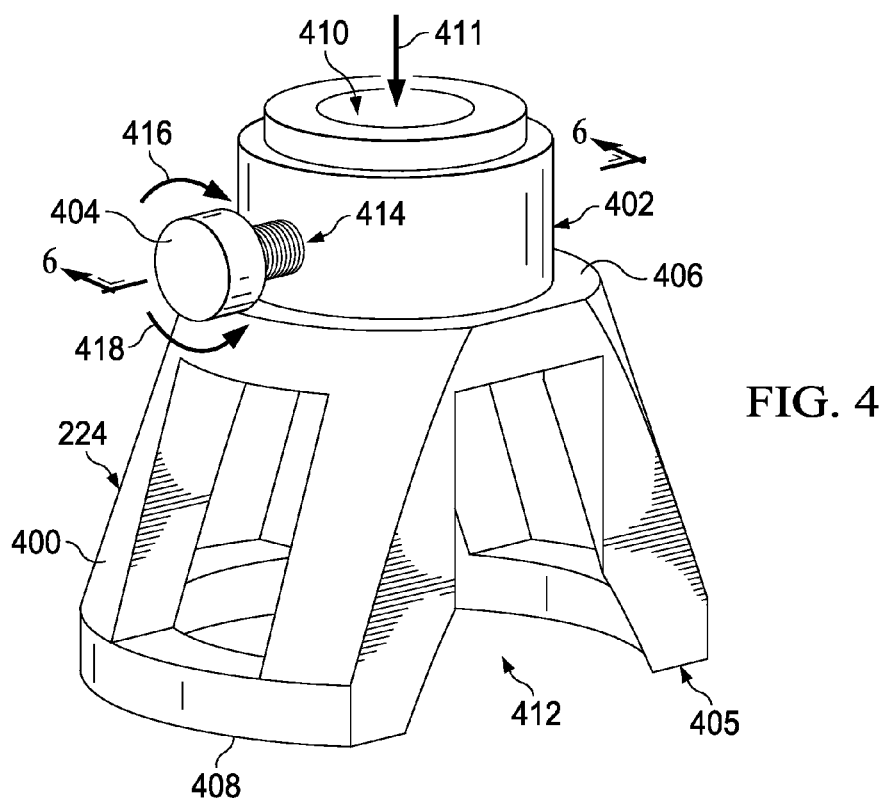
FIG. 4 is an illustration of a top isometric view of a first stability device in accordance with an illustrative embodiment.

With reference now to FIG. 4, an illustration of a top isometric view of first stability device 224 is depicted in accordance with an illustrative embodiment. In this illustrative example, first stability device 224 may include base 400, retaining structure 402, adjustment member 404, and stabilizing feature 405.

Base 400 may be configured for placement over a surface near or at an edge or an edge surface of an edge. Base 400 may have first side 406 and second side 408. Second side 408 may be substantially flat or planar and form stabilizing feature 405. Because the surface of second side 408 is substantially flat, base 400 may be positioned over a small portion of surface, such as an edge surface.

Retaining structure 402 may be associated with first side 406 of base 400. As used herein, when one component is "associated" with another component, the association is a physical association in the depicted examples.

For example, a first component, such as retaining structure 402, may be considered to be associated with a second component, such as base 400, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Retaining structure 402 may be configured to receive and hold, for example, without limitation, probe 222 of indicator 208 from FIGS. 2-3. Retaining structure 402 may have opening 410. Base 400 may have open shape 412. Probe 222 of indicator 208 may be inserted through opening 410 of retaining structure 402 and through open shape 412 of base 400 in the direction of arrow 411.

Once probe 222 has been inserted through retaining structure 402, adjustment member 404 may be used to secure probe 222 to first stability device 224. As depicted, adjustment member 404 may be positioned within opening 414 in retaining structure 402. Adjustment member 404 may be a threaded fastener in this illustrative example.

Adjustment member 404 may be rotated in the direction of arrow 416 to secure probe 222 to retaining structure 402 such that probe 222 may not be movable relative to retaining structure 402. In this manner, adjustment member 404 may be used to stabilize a position and/or orientation of probe 222 relative to first stability device 224. Further, adjustment member 404 may be rotated in the direction of arrow 418 to release probe 222 such that probe 222 may be moved independently of retaining structure 402.

Figure 5:
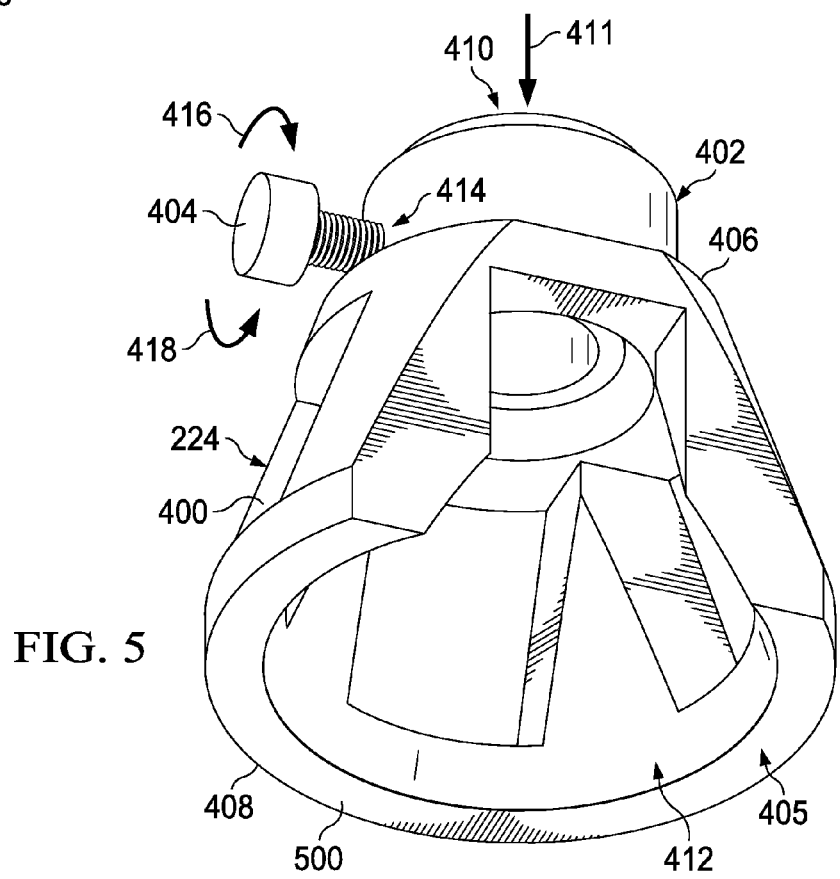
FIG. 5 is an illustration of a bottom isometric view of a first stability device in accordance with an illustrative embodiment.

With reference now to FIG. 5, an illustration of a bottom isometric view of first stability device 224 from FIG. 4 is depicted in accordance with an illustrative embodiment. As depicted, surface 500 of second side 408 of base 400 may be seen. Surface 500 may be substantially flat.

Figure 6:
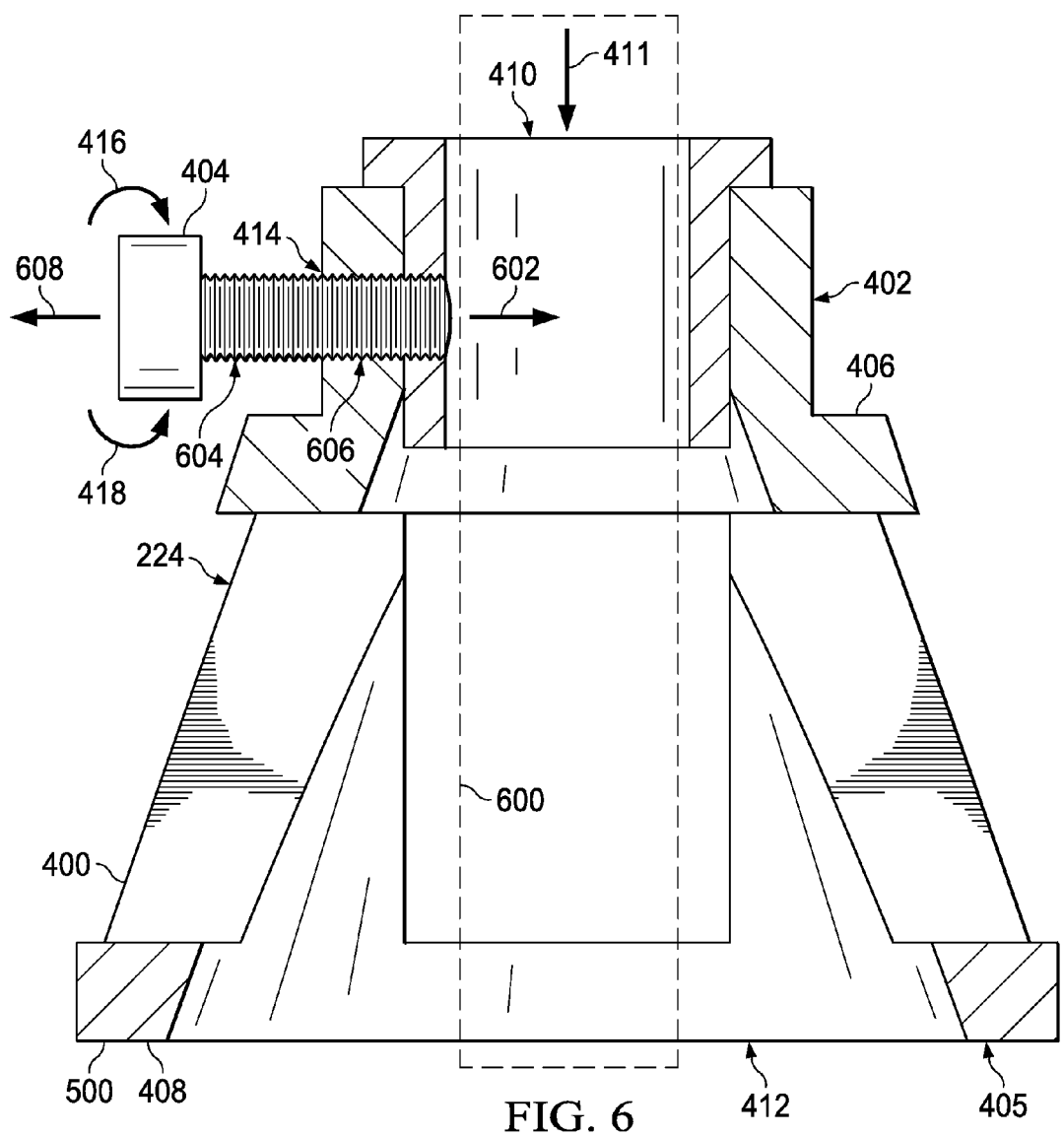
FIG. 6 is an illustration of a cross-sectional view of a first stability device in accordance with an illustrative embodiment.

Turning now to FIG. 6, an illustration of a cross-sectional view of first stability device 224 from FIG. 4 is depicted in accordance with an illustrative embodiment. In this illustrative example, a cross-sectional view of first stability device 224 from FIG. 4 is depicted taken with respect to lines 6-6 in FIG. 4.

As depicted, first stability device 224 may form channel 600 through which probe 222 of indicator 208 from FIGS. 2-3 may be inserted. Once probe 222 has been inserted through channel 600, adjustment member 404 may be moved in the direction of arrow 602 to secure probe 222 to retaining structure 402. In particular, adjustment member 404 may have outer threads 604 configured to engage inner threads 606 that line opening 414. Adjustment member 404 may be threaded in the direction of arrow 602 to secure probe 222 to retaining structure 402. Adjustment member 404 may be moved in the direction of arrow 608 to release probe 222 from retaining structure 402.

Figure 7:
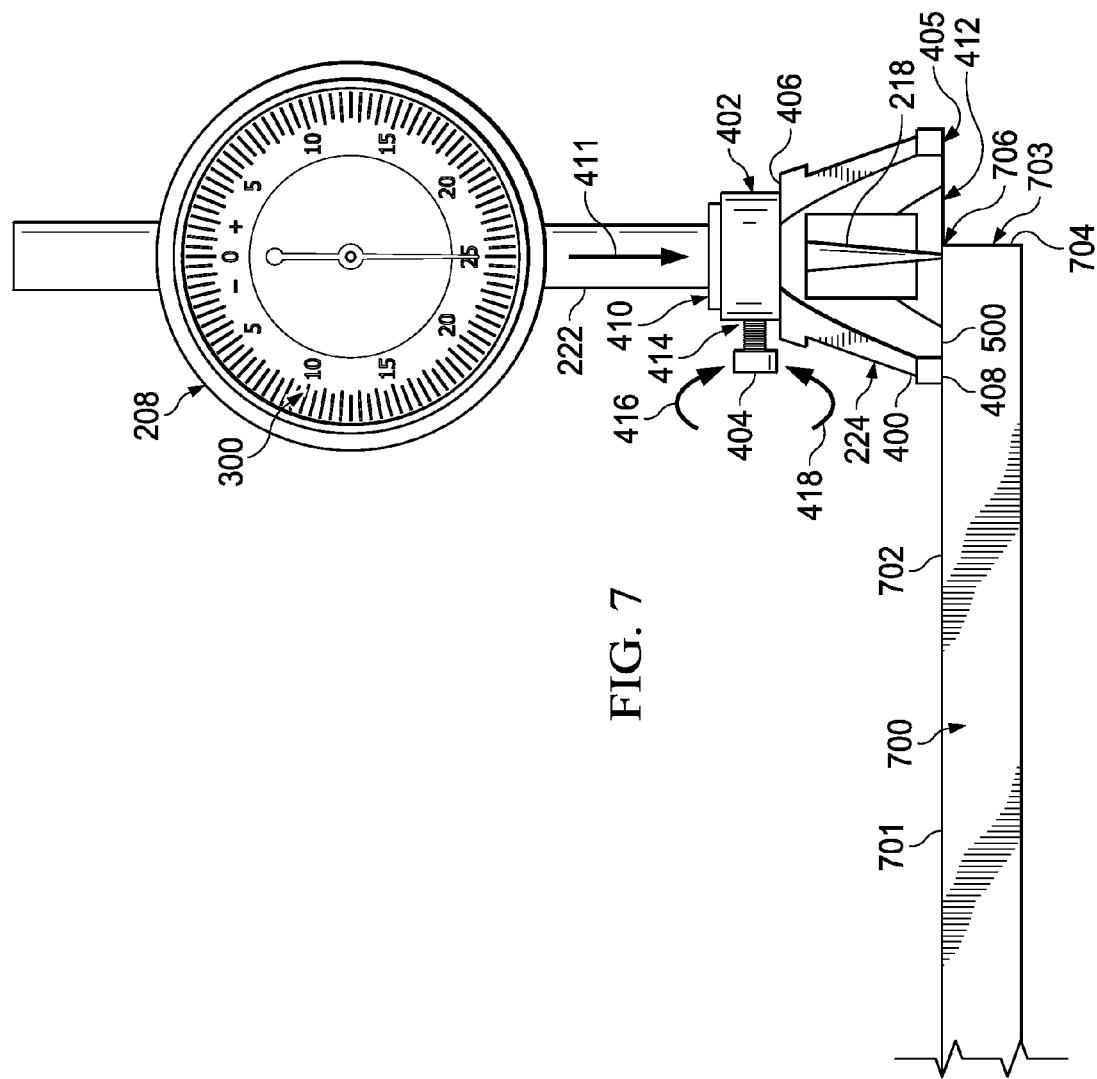
FIG. 7 is an illustration of a side view of an indicator, with a tip attached to a probe, being stabilized by a first stability device over an object in accordance with an illustrative embodiment.

With reference now to FIG. 7, an illustration of a side view of indicator 208, with tip 218 attached to probe 222, being stabilized by first stability device 224 over an object is depicted in accordance with an illustrative embodiment. In this illustrative example, first stability device 224 may stabilize probe 222 of indicator 208 with tip 218 attached to probe 222 over object 700.

In particular, probe 222 may be stabilized relative to surface 701 of object 700 at side 702 of object 700. As depicted, using first stability device 224 may allow tip 218 attached to probe 222 to be moved near edge 703 of object 700. Tip 218 may be moved near corner 706 between surface 701 at side 702 of object 700 and edge surface 704 of edge 703 of object 700. Stabilizing feature 405 in the form of surface 500 of base 400 may allow probe 222 and tip 218 to be stabilized near edge 703.

Figure 8:
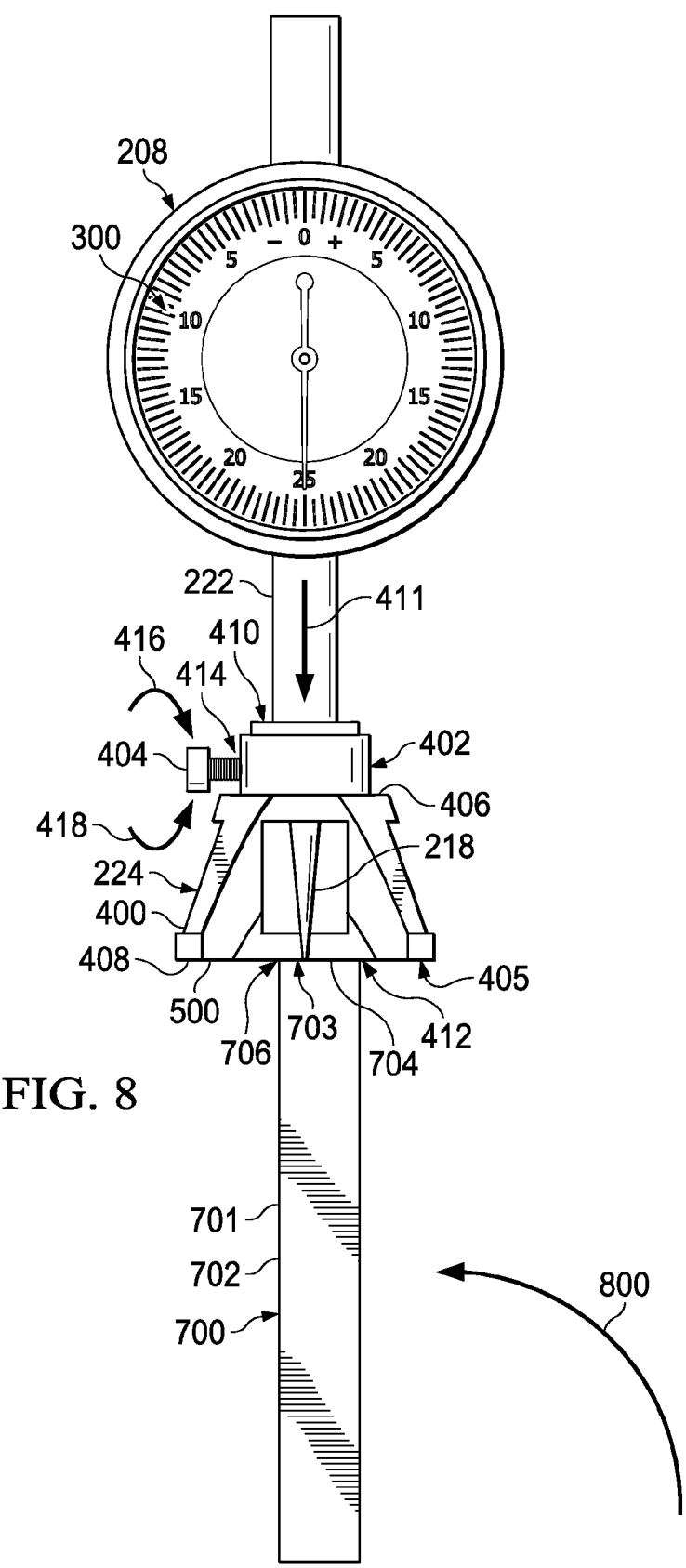
FIG. 8 is an illustration of a side view of an indicator, with a tip attached to a probe, being stabilized by a first stability device relative to an edge surface in accordance with an illustrative embodiment.

With reference now to FIG. 8, an illustration of a side view of indicator 208, with tip 218 attached to probe 222, being stabilized by first stability device 224 relative to edge surface 704 is depicted in accordance with an illustrative embodiment. In this illustrative example, object 700 from FIG. 7 has been rotated about 90 degrees in the direction of arrow 800. As depicted, stabilizing feature 405 in the form of surface 500 of base 400 may allow probe 222 and tip 218 to be stabilized relative to edge surface 704 even though base 400 may be larger than the width of edge surface 704.

Figure 9:
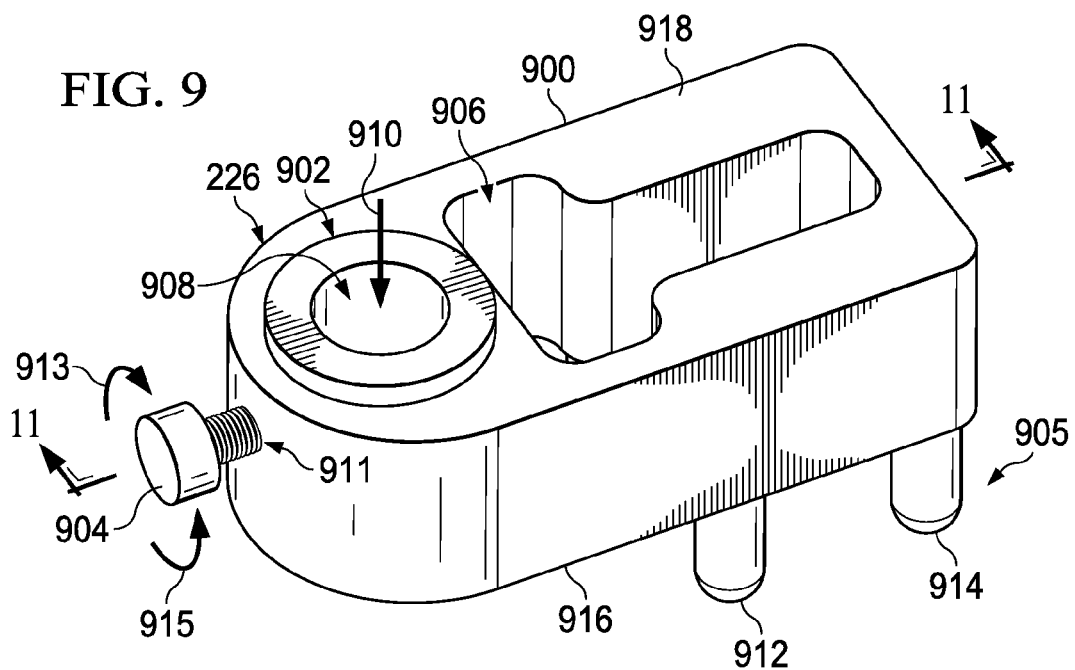
FIG. 9 is an illustration of a top isometric view of a second stability device in accordance with an illustrative embodiment.

With reference now to FIG. 9, an illustration of a top isometric view of second stability device 226 is depicted in accordance with an illustrative embodiment. In this illustrative example, second stability device 226 may include base 900, retaining structure 902, adjustment member 904, stabilizing feature 905, and viewing area 906. Second stability device 226 may be configured for stabilizing probe 222 of indicator 208 from FIGS. 2-3 relative to a multi-level surface, such as multi-level surface 146 in FIG. 1.

Retaining structure 902 may be associated with base 900. Retaining structure 902 may be configured to receive and hold, for example, probe 222 of indicator 208 from FIGS. 2-3. Retaining structure 902 may have opening 908 configured to receive probe 222 with tip 218 attached to probe 222. Probe 222 of indicator 208 may be inserted through opening 908 of retaining structure 902 in the direction of arrow 910.

Once probe 222 has been inserted through retaining structure 902, adjustment member 904 may be used to secure probe 222 to second stability device 226. As depicted, adjustment member 904 may be positioned within opening 911 in base 900. Adjustment member 904 may be a threaded fastener in this illustrative example.

Adjustment member 904 may be rotated in the direction of arrow 913 to secure probe 222 to retaining structure 902 such that probe 222 may not be movable relative to retaining structure 902. In this manner, adjustment member 904 may be used to stabilize a position and/or orientation of probe 222 relative to second stability device 226. Further, adjustment member 904 may be rotated in the direction of arrow 915 to release probe 222 such that probe 222 may be moved independently of retaining structure 902.

Stabilizing feature 905 may include member 912, member 914, and two additional members not shown in this view. These members may be used for positioning base 900 on a first level of a multi-level surface, such as first level 150 of multi-level surface 146 in FIG. 1, while retaining structure 902 may be used to stabilize probe 222 and tip 218 over a second level of the multi-level surface, such as second level 152 in FIG. 1.

As depicted, base 900 may have first side 916 and second side 918. Viewing area 906 may be formed by a hollow portion of base 900 that extends from first side 916 to second side 918. Viewing area 906 may allow a human operator to view tip 218 of probe 222.

Figure 10:
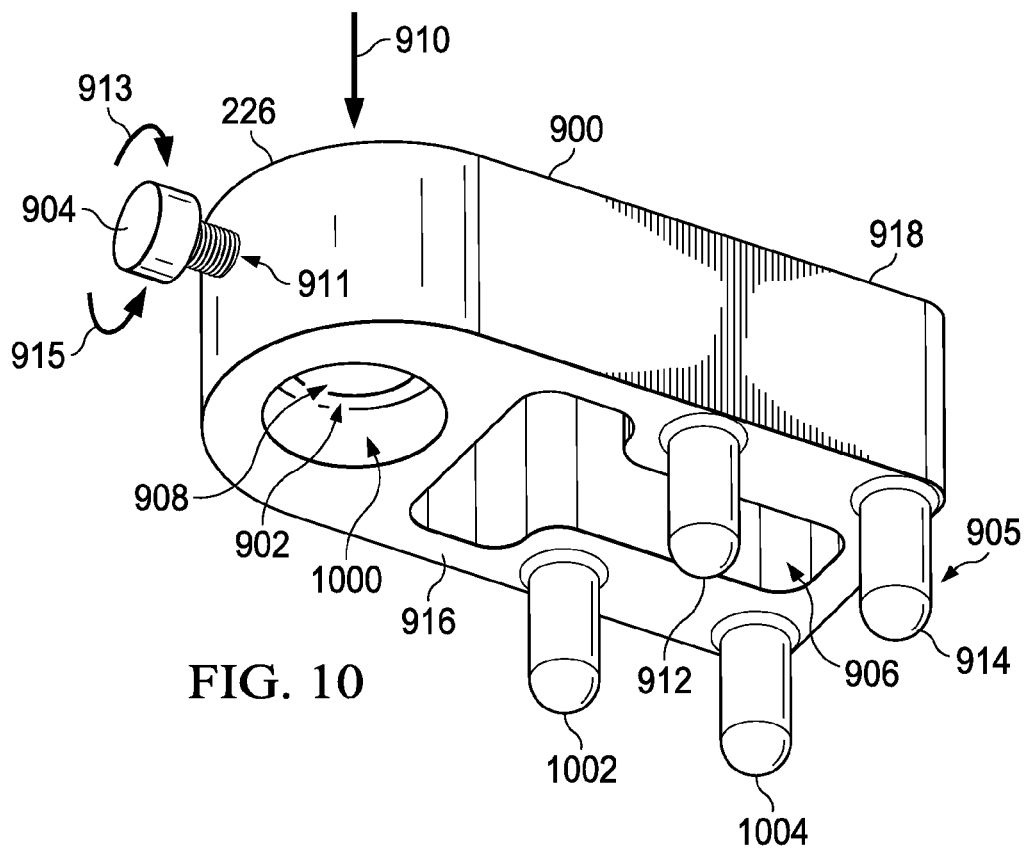
FIG. 10 is an illustration of a bottom isometric view of a second stability device in accordance with an illustrative embodiment.

With reference now to FIG. 10, an illustration of a bottom isometric view of second stability device 226 from FIG. 9 is depicted in accordance with an illustrative embodiment. As depicted, base 900 may have opening 1000 through which tip 218 may pass. Further, member 1002 and member 1004 that form stabilizing feature 905 may also be seen in this illustrative example.

Figure 11:
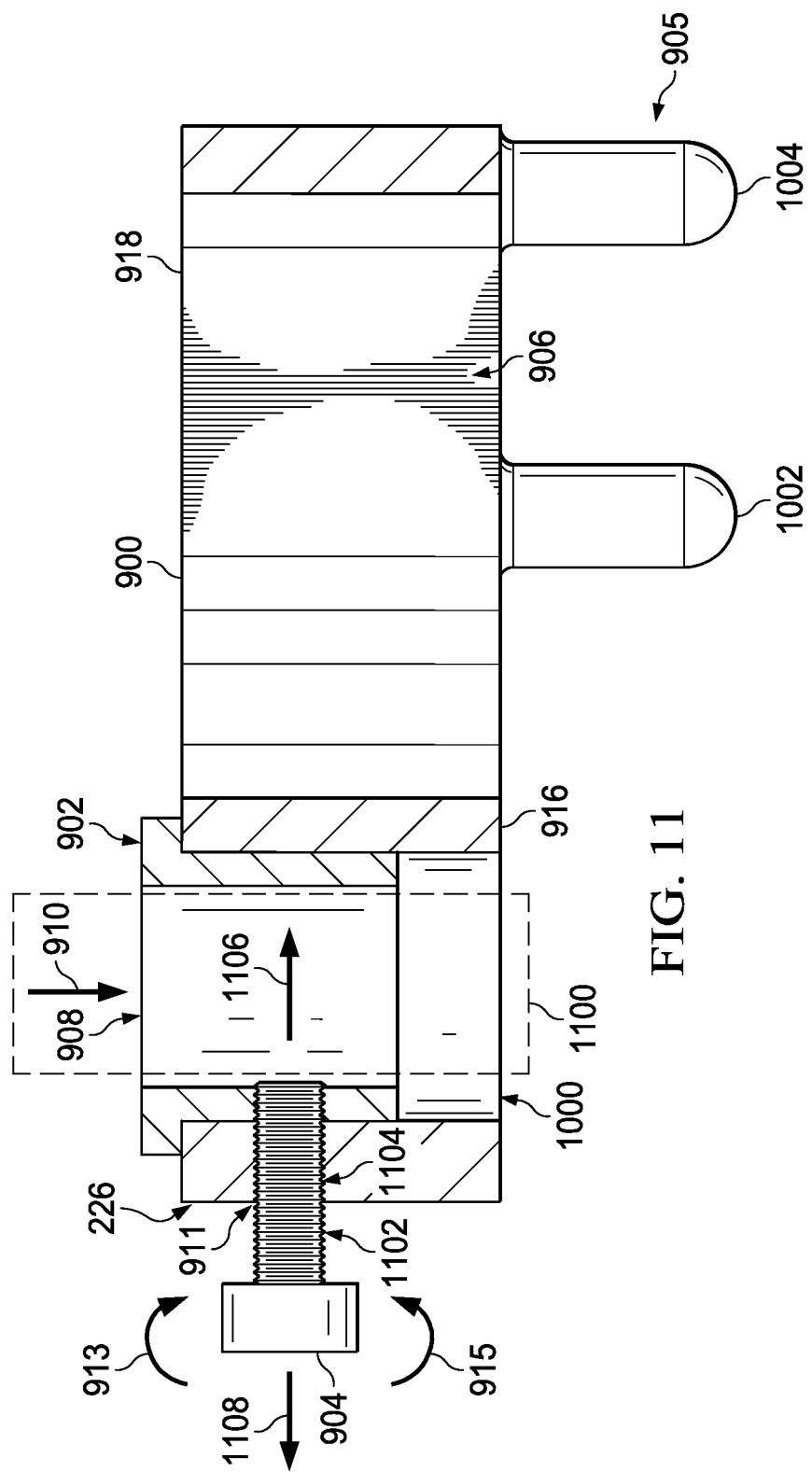
FIG. 11 is an illustration of a cross-sectional view of a second stability device in accordance with an illustrative embodiment.

Turning now to FIG. 11, an illustration of a cross-sectional view of second stability device 226 from FIG. 9 is depicted in accordance with an illustrative embodiment. In this illustrative example, a cross-sectional view of second stability device 226 from FIG. 9 is depicted taken with respect to lines 11-11 in FIG. 9.

As depicted, second stability device 226 may form channel 1100 through which probe 222 of indicator 208 from FIGS. 2-3 may be inserted. Adjustment member 904 may have outer threads 1102 configured to engage inner threads 1104 that line opening 911. Once probe 222 has been inserted through channel 1100, adjustment member 904 may be moved in the direction of arrow 1106 to secure probe 222 to retaining structure 902. Adjustment member 904 may be moved in the direction of arrow 1108 to release probe 222 from retaining structure 902.

Figure 12:
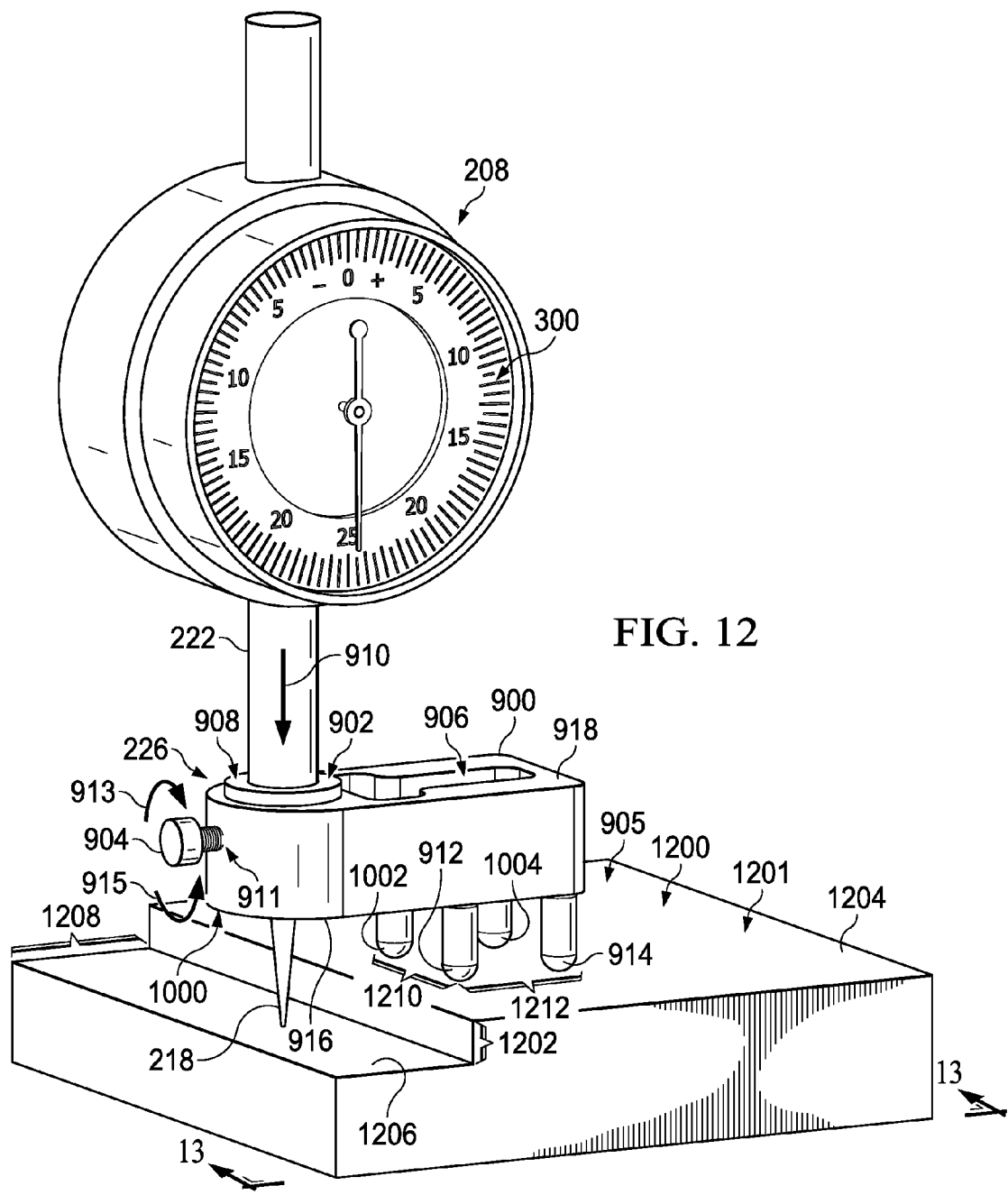
FIG. 12 is an illustration of an isometric view of an indicator, with a tip attached to a probe, being stabilized by a second stability device over an object in accordance with an illustrative embodiment.

With reference now to FIG. 12, an illustration of an isometric view of indicator 208, with tip 218 attached to probe 222, being stabilized by second stability device 226 over an object is depicted in accordance with an illustrative embodiment. In this illustrative example, second stability device 226 may stabilize probe 222 of indicator 208 with tip 218 attached to probe 222 over object 1200.

Object 1200 may have multi-level surface 1201. Multi-level surface 1201 may include step feature 1202 that separates first level 1204 of multi-level surface 1201 from second level 1206 of multi-level surface 1201. Width 1208 of second level 1206 may be smaller than distance 1210 between member 1002 and member 912 and between member 1004 and member 914 and smaller than distance 1212 between member 1002 and member 1004 and between member 912 and member 914. Consequently, stabilizing feature 905 may be used to position base 900 over first level 1204 such that tip 218 may be positioned over second level 1206.

Figure 13:
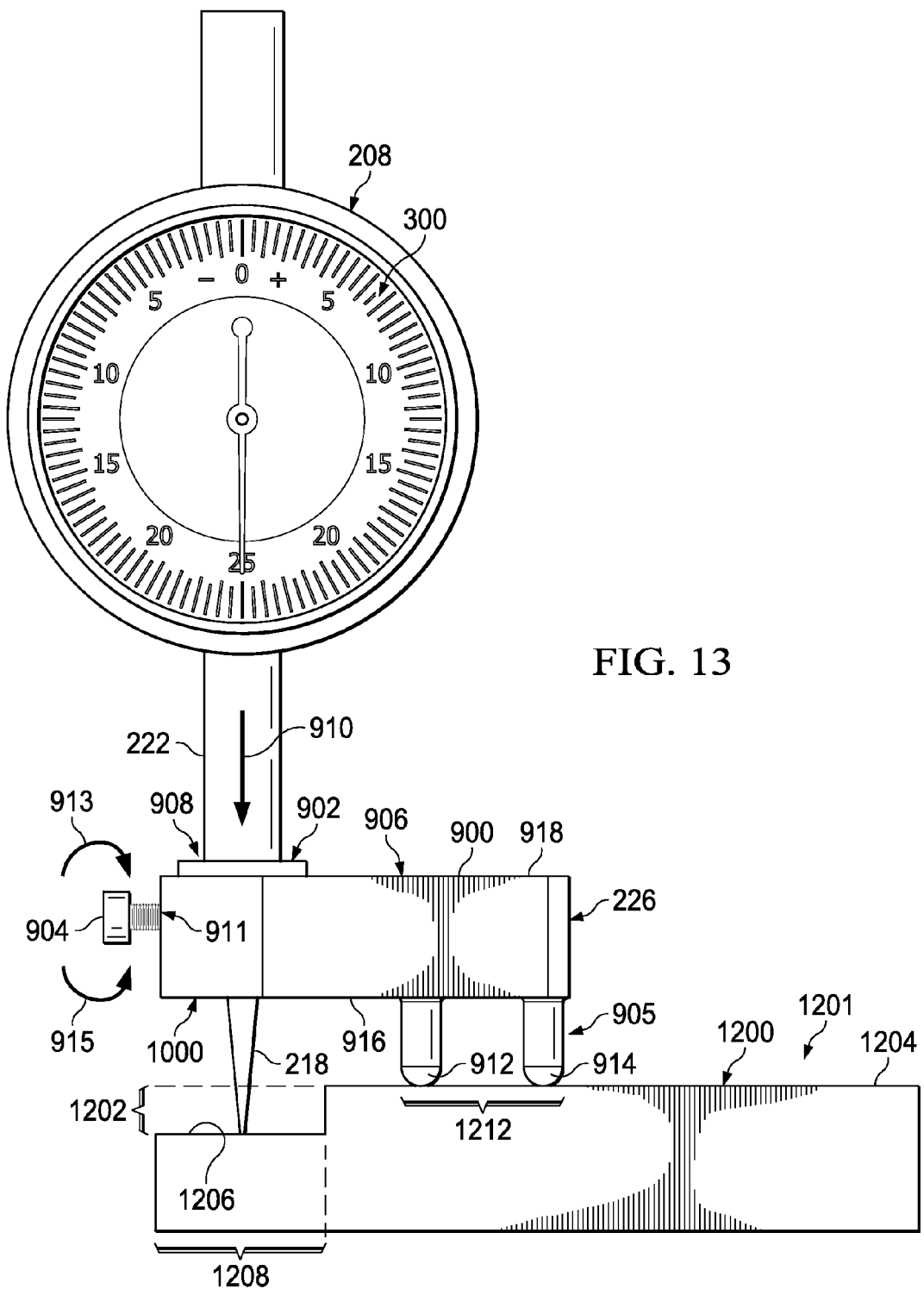
FIG. 13 is an illustration of a side view of an indicator, with a tip attached to a probe, being stabilized by a second stability device relative to a multi-level surface in accordance with an illustrative embodiment.

With reference now to FIG. 13, an illustration of a side view of indicator 208, with tip 218 attached to probe 222, being stabilized by second stability device 226 relative to multi-level surface 1201 from FIG. 12 is depicted in accordance with an illustrative embodiment. In this illustrative example, a side view of indicator 208, with tip 218 attached to probe 222, being stabilized by second stability device 226 relative to multi-level surface 1201 of object 1200 is depicted taken with respect to lines 13-13 in FIG. 12.

With reference now to FIG. 14, an illustration of a top isometric view of third stability device 228 is depicted in accordance with an illustrative embodiment. In this illustrative example, third stability device 228 may include base 1400, retaining structure 1402, adjustment member 1404, adjustable stabilizing feature 1405, and fixed stabilizing feature 1406. Third stability device 228 may be configured for stabilizing probe 222 of indicator 208 from FIGS. 2-3 relative to an interior corner, such as interior corner 154 in FIG. 1.

Retaining structure 1402 may be associated with base 1400. Retaining structure 1402 may be configured to receive and hold, for example, probe 222 of indicator 208 from FIGS. 2-3. Retaining structure 1402 may have opening 1407 configured to receive probe 222 with tip 218 attached to probe 222. Probe 222 of indicator 208 may be inserted through opening 1407 of retaining structure 1402 in the direction of arrow 1408.

Once probe 222 has been inserted through retaining structure 1402, adjustment member 1404 may be used to secure probe 222 to third stability device 228. As depicted, adjustment member 1404 may be positioned within opening 1410 in base 1400. Adjustment member 1404 may be implemented and operated in a manner similar to adjustment member 904 in FIGS. 9-13 and adjustment member 404 in FIGS. 4-8. As depicted, adjustment member 1404 may be a threaded fastener in this example.

Adjustment member 1404 may be rotated in the direction of arrow 1412 to secure probe 222 to retaining structure 1402 such that probe 222 may not be movable relative to retaining structure 1402. In this manner, adjustment member 1404 may be used to stabilize a position and/or orientation of probe 222 relative to third stability device 228. Further, adjustment member 1404 may be rotated in the direction of arrow 1413 to release probe 222 such that probe may be moved independently of retaining structure 1402.

Adjustable stabilizing feature 1405 may include adjustment member 1414 located on side 1415 of base 1400. Adjustment member 1414 may be a threaded fastener in this illustrative example. Further, fixed stabilizing feature 1406 may include member 1416 and member 1417 located on side 1418 of base 1400. Adjustment member 1414 may be configured to contact a first side that forms an interior corner, while member 1416 and member 1417 may be configured to contact a second side that forms the interior corner. Side 1420 of base may be configured to face the interior corner. Side 1415 and side 1418 not forming a right angle with each other and instead, being separated by side 1420, may allow base 1400 to be used with curved interior corners.

Viewing area 1422 may be formed by a hollow portion of base 1400. Viewing area 1422 may allow a human operator to view tip 218 of probe 222.

With reference now to FIG. 15, an illustration of a bottom isometric view of third stability device 228 from FIG. 14 is depicted in accordance with an illustrative embodiment. As depicted, base 1400 may have opening 1500 through which tip 218 may pass.

Figure 16:
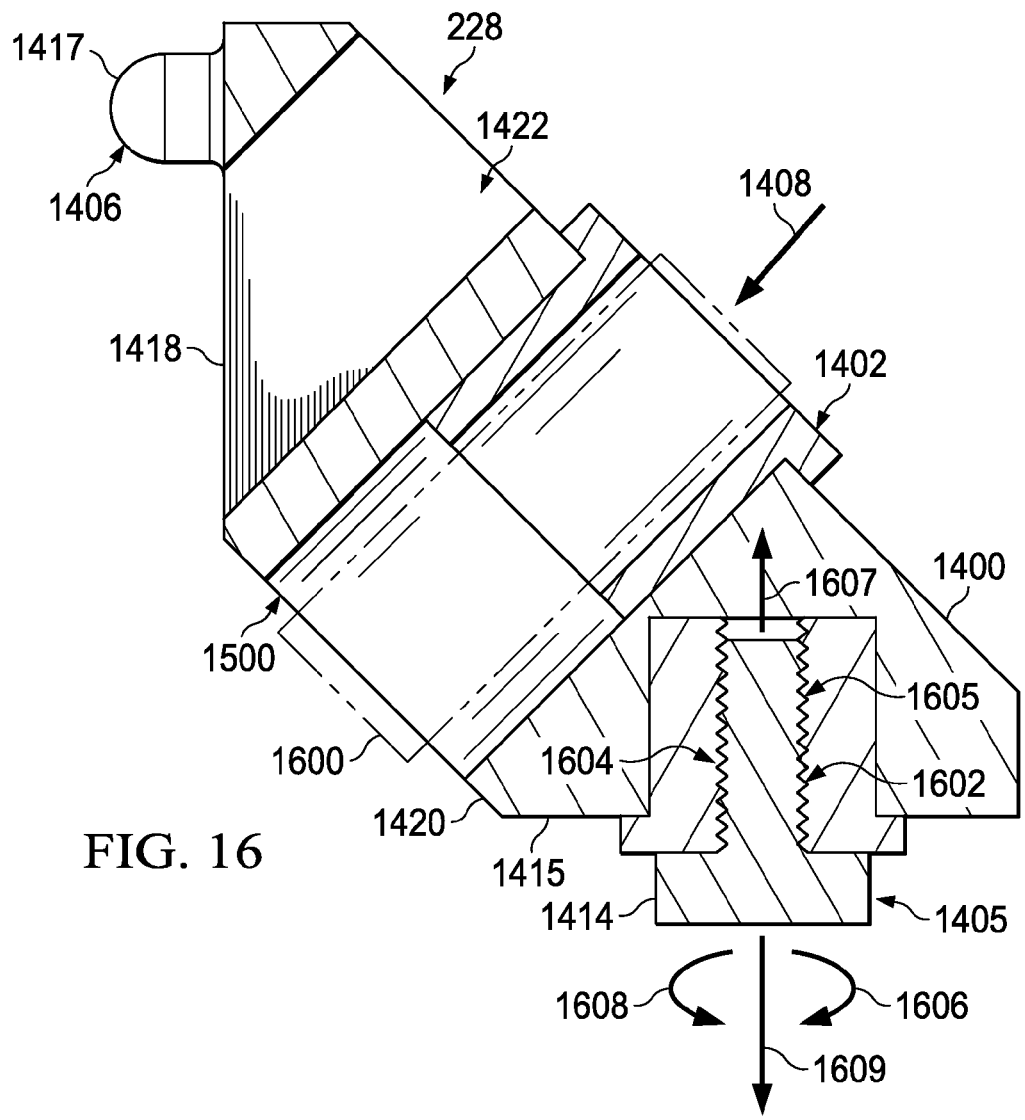
FIG. 16 is an illustration of a cross-sectional view of a third stability device in accordance with an illustrative embodiment.

Turning now to FIG. 16, an illustration of a cross-sectional view of third stability device 228 from FIG. 14 is depicted in accordance with an illustrative embodiment. In this illustrative example, a cross-sectional view of third stability device 228 from FIG. 14 is depicted taken with respect to lines 16-16 in FIG. 14.

As depicted, third stability device 228 may form channel 1600 through which probe 222 of indicator 208 from FIGS. 2-3 may be inserted. Adjustment member 1414 of adjustable stabilizing feature 1405 may have outer threads 1602 configured to engage inner threads 1604 that line channel 1605 within base 1400. Once probe 222 with tip 218 has been inserted through channel 1600, adjustment member 1414 may be used to adjust the position of probe 222 and thereby tip 218 relative to the interior corner.

For example, without limitation, adjustment member 1414 may be rotated in the direction of arrow 1606 to move base 1400, and thereby probe 222 secured to base 1400, in the direction of arrow 1607. Conversely, adjustment member 1414 may be rotated in the direction of arrow 1608 to move base 1400, and thereby probe 222 secured to base 1400, in the direction of arrow 1609.

Figure 17:
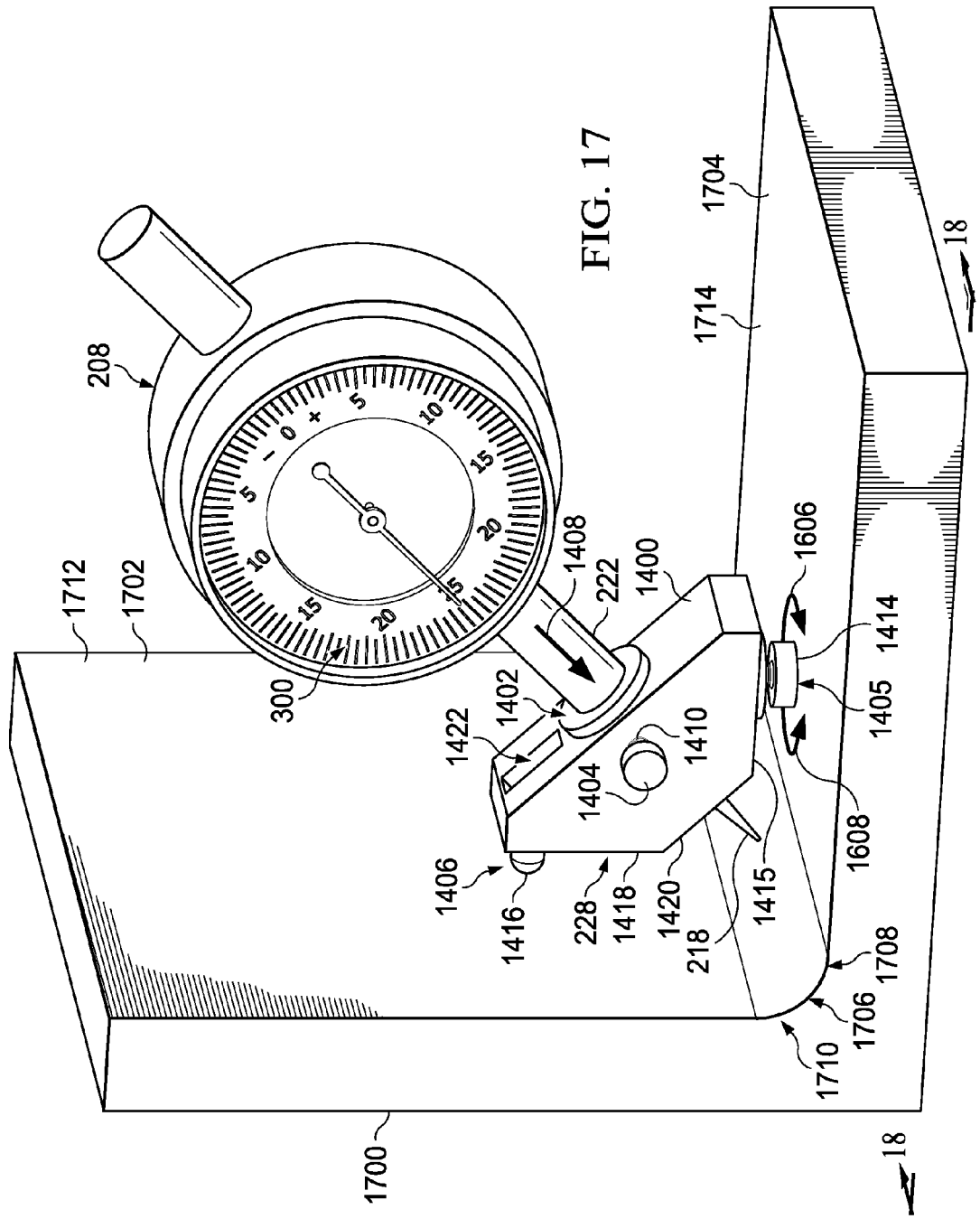
FIG. 17 is an illustration of an isometric view of an indicator, with a tip attached to a probe, being stabilized by a third stability device over an object in accordance with an illustrative embodiment.

With reference now to FIG. 17, an illustration of an isometric view of indicator 208, with tip 218 attached to probe 222, being stabilized by third stability device 228 over an object is depicted in accordance with an illustrative embodiment. In this illustrative example, third stability device 228 may stabilize probe 222 of indicator 208 with tip 218 attached to probe 222 over object 1700.

Object 1700 may be comprised of first portion 1702 and second portion 1704 joined by interior corner 1706. In this illustrative example, interior corner 1706 may take the form of curved interior corner 1708. In particular, curved interior corner 1708 may be fillet 1710.

As depicted, fixed stabilizing feature 1406 and adjustable stabilizing feature 1405 may be used to stabilize probe 222 with tip 218 relative to first portion 1702 and second portion 1704, respectively. In particular, member 1416 and member 1417 (not shown in this view) may contact first surface 1712 of first portion 1702 of object 1700, while adjustment member 1414 may contact second surface 1714 of second portion 1704 of object 1700. Adjustment member 1414 may be used to adjust the position of tip 218 relative to fillet 1710.

Figure 18:
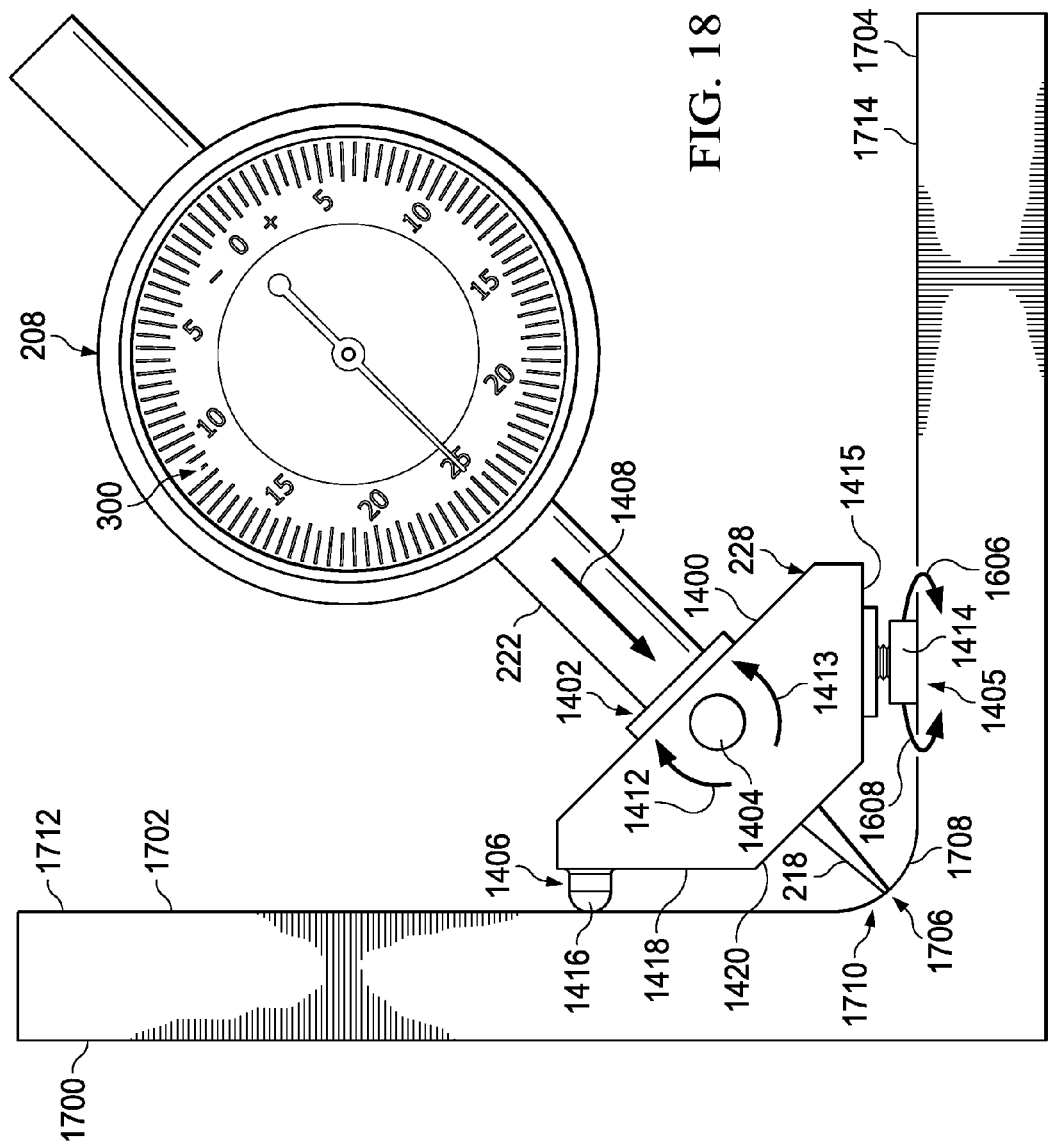
FIG. 18 is an illustration of a side view of an indicator, with a tip attached to a probe, being stabilized by a third stability device relative to a fillet in accordance with an illustrative embodiment.

With reference now to FIG. 18, an illustration of a side view of indicator 208, with tip 218 attached to probe 222, being stabilized by third stability device 228 relative to fillet 1710 from FIG. 17 is depicted in accordance with an illustrative embodiment. In this illustrative example, a side view of indicator 208, with tip 218 attached to probe 222, being stabilized by third stability device 228 relative to fillet 1710 of object 1700 is depicted taken with respect to lines 18-18 in FIG. 17. As depicted, tip 218 has been positioned such that tip 218 is directed towards a center of fillet 1710.

Figure 19:
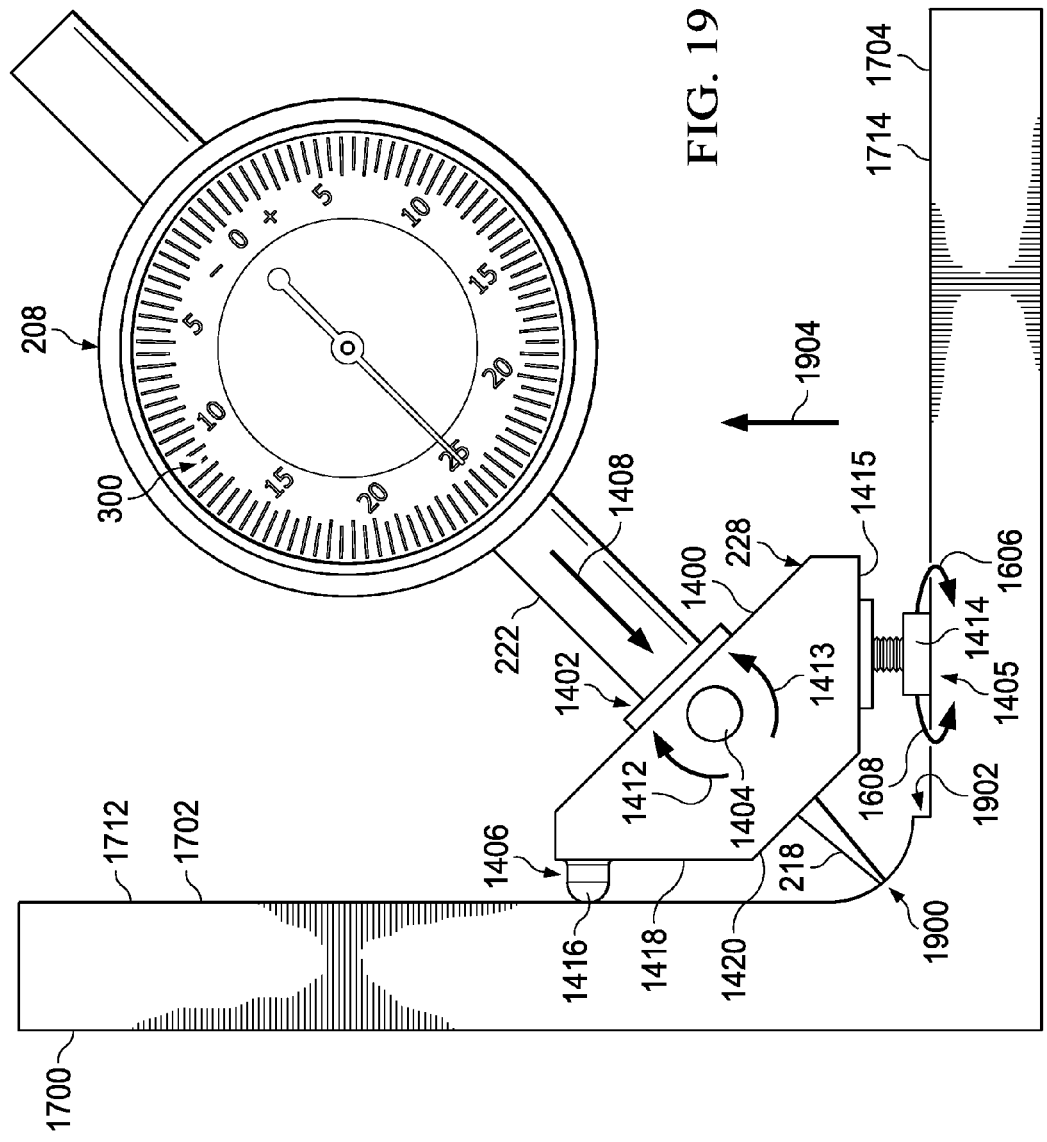
FIG. 19 is an illustration of a side view of an indicator, with a tip attached to a probe, being stabilized by a third stability device relative to an interior corner in accordance with an illustrative embodiment.

With reference now to FIG. 19, an illustration of a side view of indicator 208, with tip 218 attached to probe 222, being stabilized by third stability device 228 relative to an interior corner is depicted in accordance with an illustrative embodiment. In this illustrative example, fillet 1710 from FIG. 17 has been modified to form fillet 1900. In particular, step feature 1902 has been added to object 1700. Adjustment member 1414 has been rotated in the direction of arrow 1606, resulting in base 1400, and thereby probe 222 with tip 218, being moved in the direction of arrow 1904.

Figure 20:
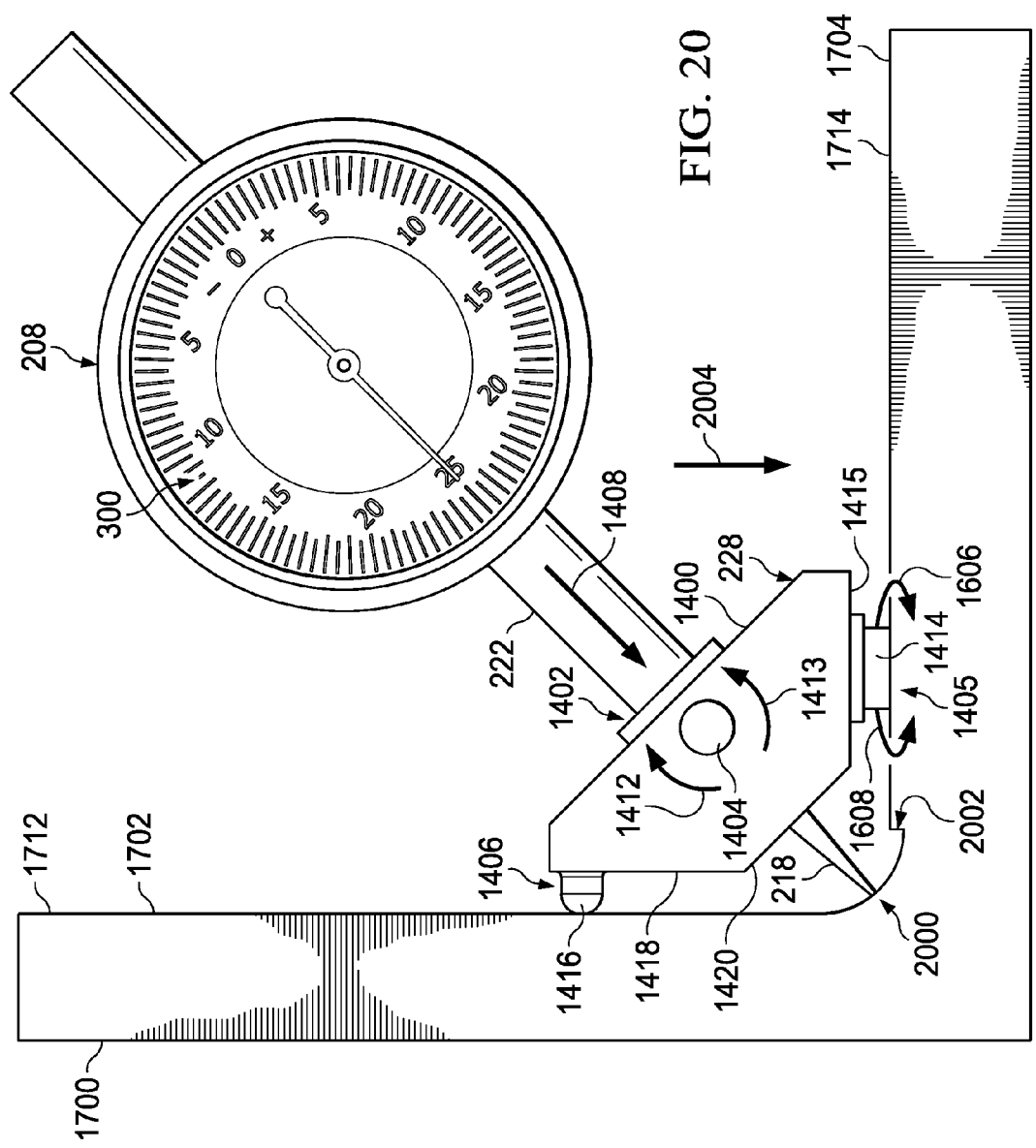
FIG. 20 is another illustration of a side view of an indicator, with a tip attached to a probe, being stabilized by a third stability device relative to an interior corner in accordance with an illustrative embodiment.

With reference now to FIG. 20, another illustration of a side view of indicator 208, with tip 218 attached to probe 222, being stabilized by third stability device 228 relative to an interior corner is depicted in accordance with an illustrative embodiment. In this illustrative example, fillet 1710 from FIG. 17 has been modified to form fillet 2000. In particular, step feature 2002 has been added to object 1700. Adjustment member 1414 has been rotated in the direction of arrow 1608, resulting in base 1400, and thereby probe 222 with tip 218, being moved in the direction of arrow 2004.

Figure 21:
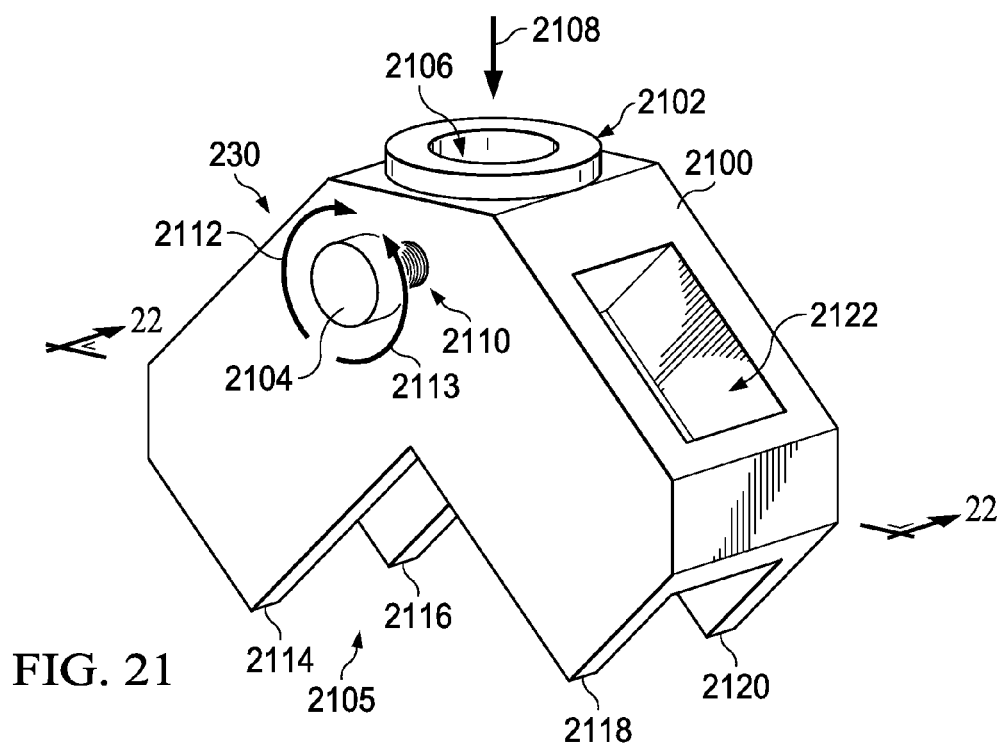
FIG. 21 is an illustration of a top isometric view of a fourth stability device in accordance with an illustrative embodiment.

With reference now to FIG. 21, an illustration of a top isometric view of fourth stability device 230 is depicted in accordance with an illustrative embodiment. In this illustrative example, fourth stability device 230 may include base 2100, retaining structure 2102, adjustment member 2104, and stabilizing feature 2105. Fourth stability device 230 may be configured for stabilizing probe 222 of indicator 208 from FIGS. 2-3 relative to an exterior corner, such as exterior corner 160 in FIG. 1.

Retaining structure 2102 may be associated with base 2100. Retaining structure 2102 may be configured to receive and hold, for example, probe 222 of indicator 208 from FIGS. 2-3. Retaining structure 2102 may have opening 2106 configured to receive probe 222 with tip 218 attached to probe 222. Probe 222 of indicator 208 may be inserted through opening 2106 of retaining structure 2102 in the direction of arrow 2108.

Once probe 222 has been inserted through retaining structure 2102, adjustment member 2104 may be used to secure probe 222 to second stability device 226. As depicted, adjustment member 2104 may be positioned within opening 2110 in base 2100. Adjustment member 2104 may be implemented and operated in a manner similar to adjustment member 904 in FIGS. 9-13 and adjustment member 404 in FIGS. 4-8. Adjustment member 2104 may be a threaded fastener in this illustrative example.

Adjustment member 2104 may be rotated in the direction of arrow 2112 to secure probe 222 to retaining structure 2102 such that probe 222 may not be movable relative to retaining structure 2102. In this manner, adjustment member 2104 may be used to stabilize a position and/or orientation of probe 222 relative to fourth stability device 230. Further, adjustment member 2104 may be rotated in the direction of arrow 2113 to release probe 222 such that probe may be moved independently of retaining structure 2102.

Stabilizing feature 2105 may include a plurality of ends. This plurality of ends may include ends 2114, 2116, 2118, and 2120. Ends 2114, 2116, 2118, and 2120 may allow base 2100 to be positioned over an exterior corner or over a curved surface, such as a convex surface.

Viewing area 2122 may be formed by a hollow portion of base 2100. Viewing area 2122 may allow a human operator to view tip 218 of probe 222.

Figure 22:
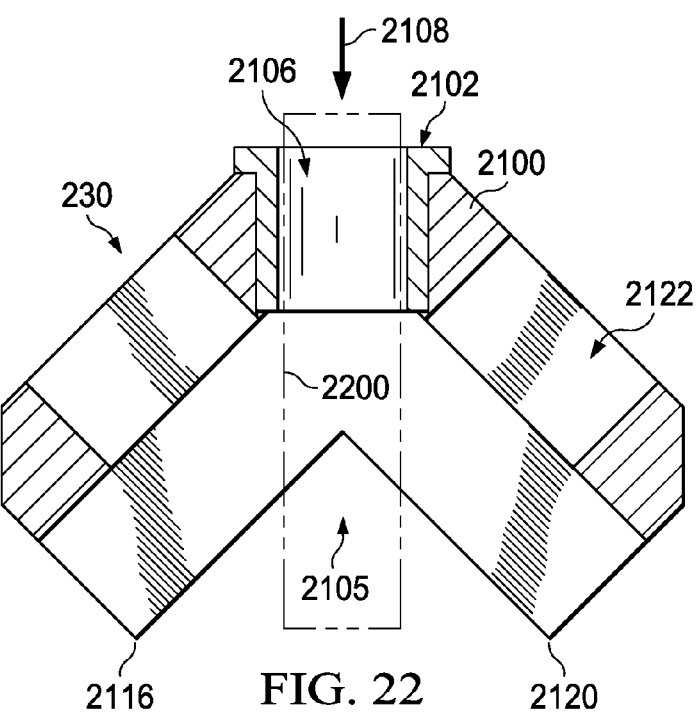
FIG. 22 is an illustration of a cross-sectional view of a fourth stability device in accordance with an illustrative embodiment.

Turning now to FIG. 22, an illustration of a cross-sectional view of fourth stability device 230 from FIG. 21 is depicted in accordance with an illustrative embodiment. In this illustrative example, a cross-sectional view of fourth stability device 230 from FIG. 21 is depicted taken with respect to lines 22-22 in FIG. 21. As depicted, fourth stability device 230 may form channel 2200 through which probe 222 of indicator 268 from FIGS. 2-3 may be inserted.

Figure 23:
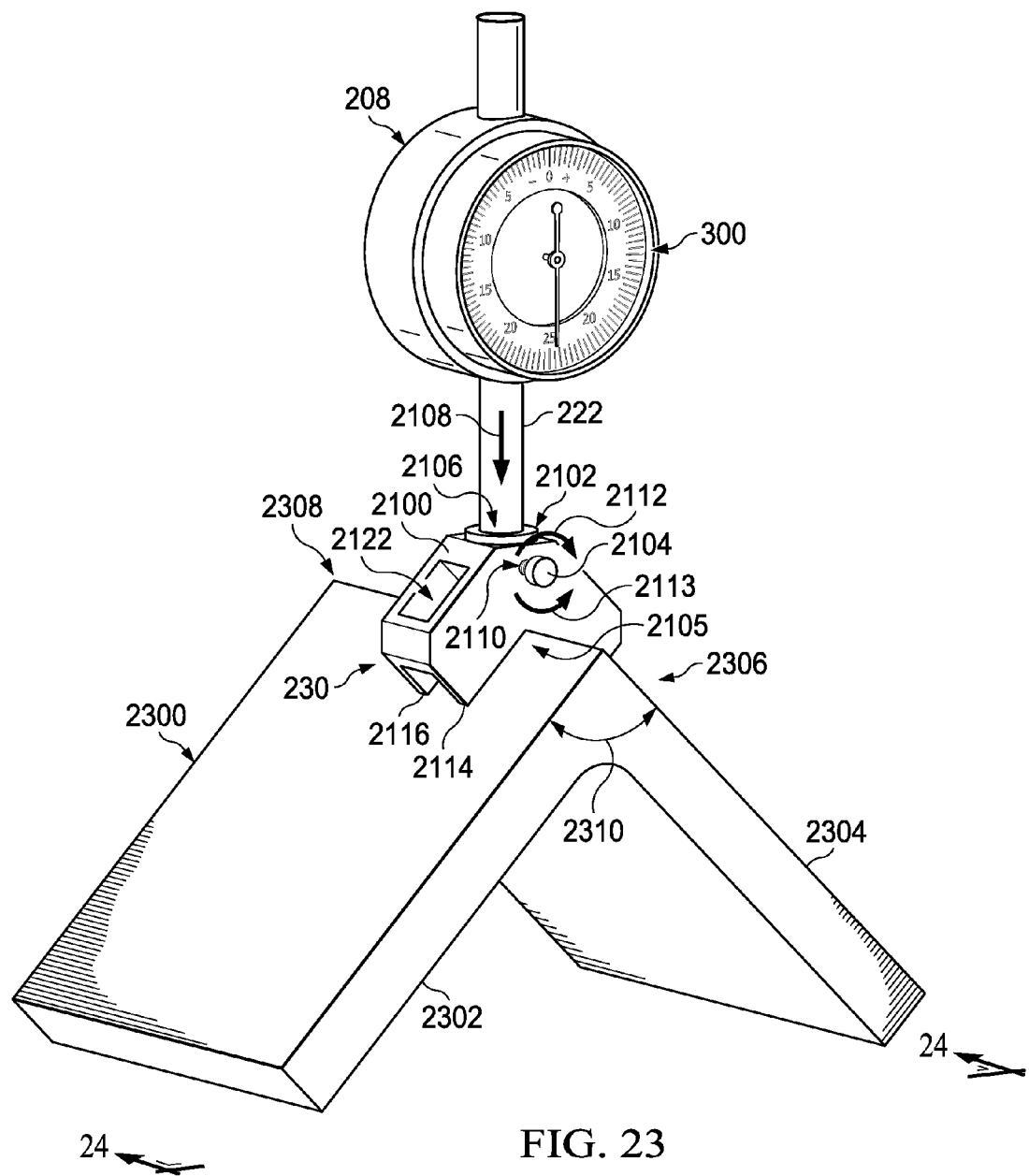
FIG. 23 is an illustration of an isometric view of an indicator, with a tip attached to a probe, being stabilized by a fourth stability device over an object in accordance with an illustrative embodiment.

With reference now to FIG. 23, an illustration of an isometric view of indicator 208, with tip 218 attached to probe 222, being stabilized by fourth stability device 230 over an object is depicted in accordance with an illustrative embodiment. In this illustrative example, fourth stability device 230 may stabilize probe 222 of indicator 208 with tip 218 attached to probe 222 over object 2300.

Object 2300 may be comprised of first portion 2302 and second portion 2304 joined together at joint 2306. In this illustrative example, exterior corner 2308 may be present at joint 2306. Exterior corner 2308 may have angle 2310 of about 90 degrees. As depicted, stabilizing feature 2105 may be used to stabilize probe 222 with tip 218 over exterior corner 2308 relative to first portion 2302 and second portion 2304.

Figure 24:
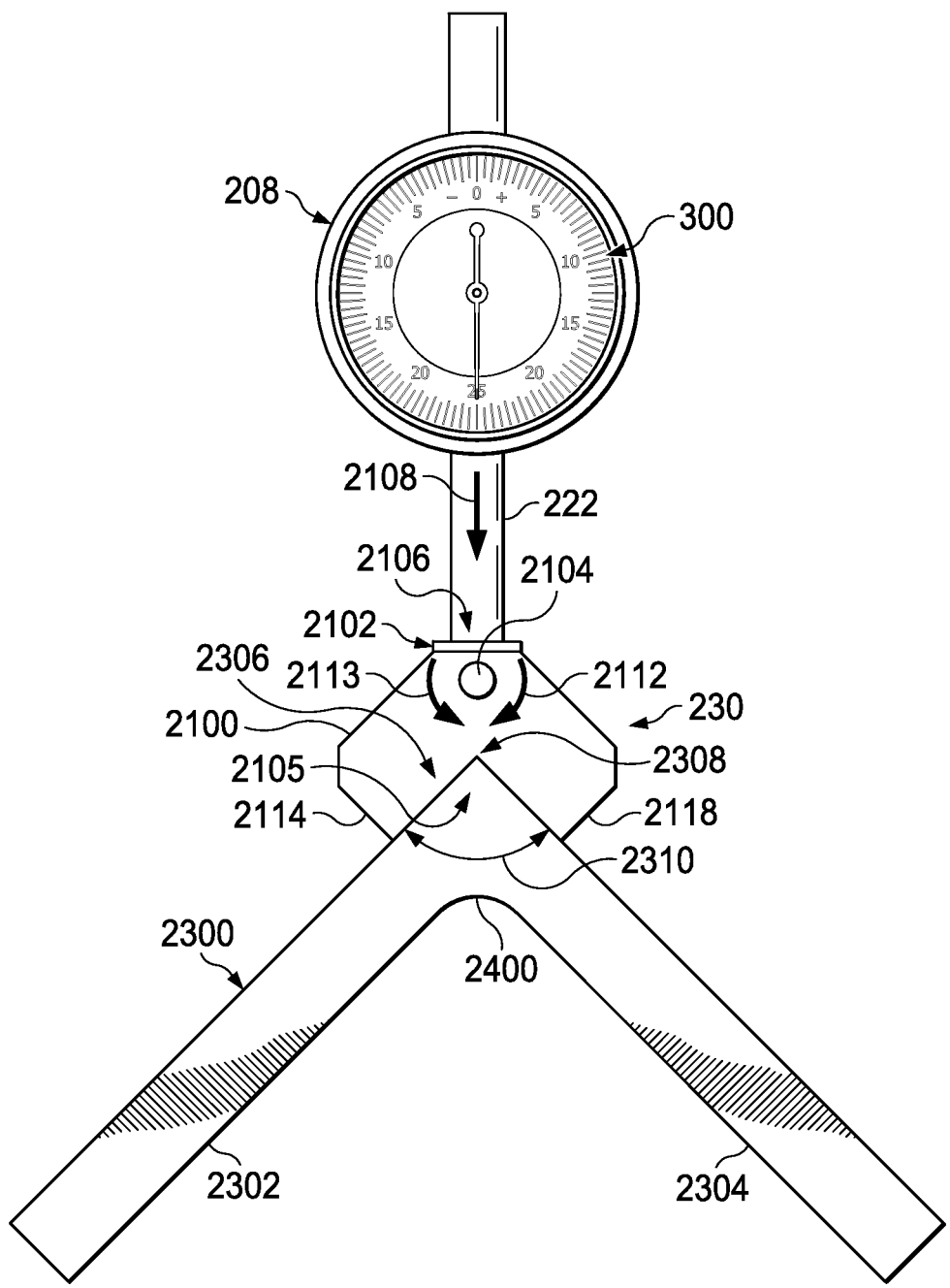
FIG. 24 is an illustration of a side view of an indicator, with a tip attached to a probe, being stabilized by a fourth stability device relative to an exterior corner in accordance with an illustrative embodiment.

With reference now to FIG. 24, an illustration of a side view of indicator 208, with tip 218 attached to probe 222, being stabilized by fourth stability device 230 relative to exterior corner 2308 from FIG. 23 is depicted in accordance with an illustrative embodiment. In this illustrative example, a side view of indicator 208, with tip 218 attached to probe 222, being stabilized by fourth stability device 230 relative to exterior corner 2308 of object 2300 is depicted taken with respect to lines 24-24 in FIG. 23.

Figure 25:
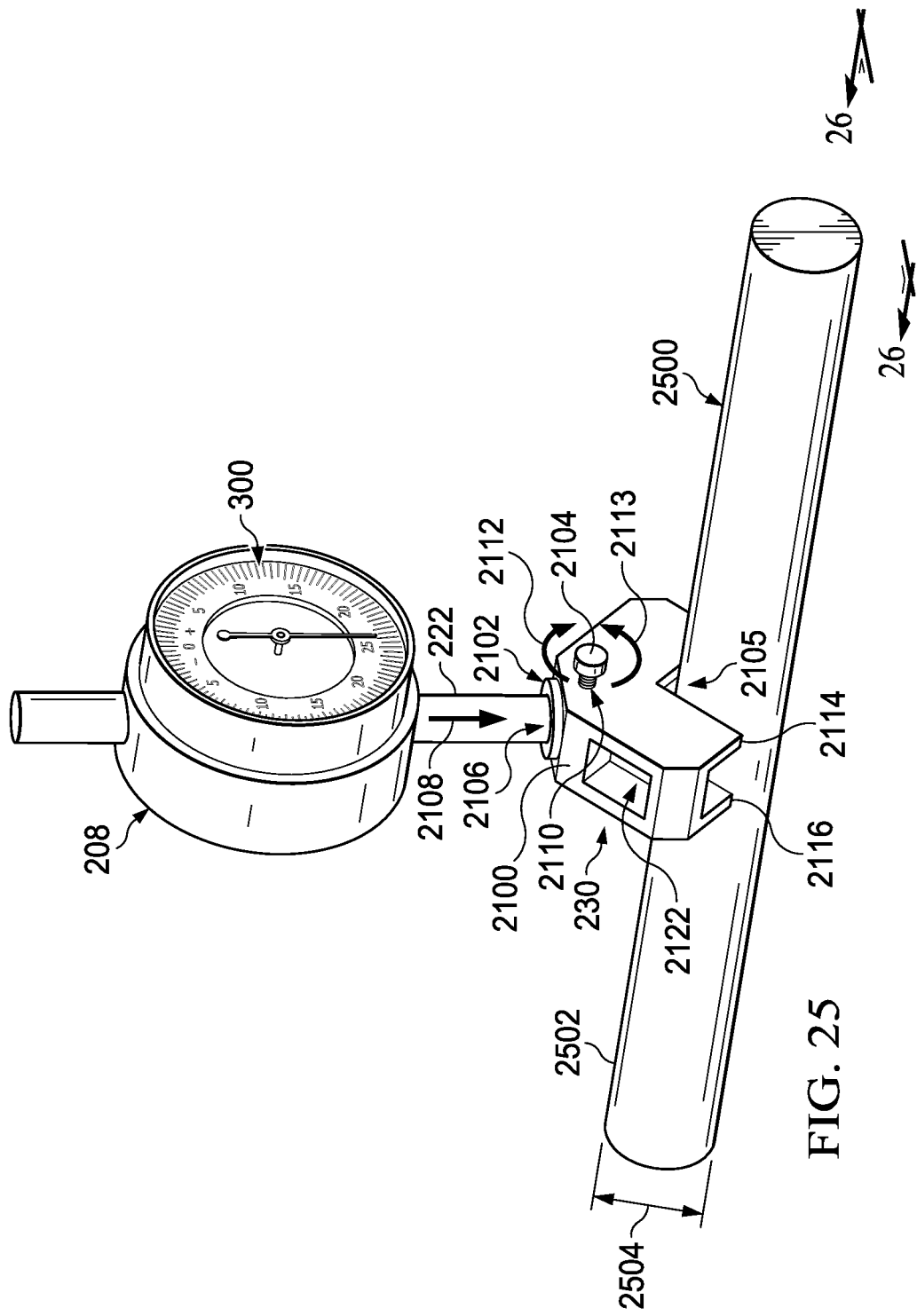
FIG. 25 is an illustration of an isometric view of an indicator, with a tip attached to a probe, being stabilized by a fourth stability device over a cylindrical object in accordance with an illustrative embodiment.

With reference now to FIG. 25, an illustration of an isometric view of indicator 208, with tip 218 attached to probe 222, being stabilized by fourth stability device 230 over a cylindrical object is depicted in accordance with an illustrative embodiment. In this illustrative example, fourth stability device 230 may stabilize probe 222 of indicator 268 with tip 218 attached to probe 222 over cylindrical object 2500.

Cylindrical object 2500 may have curved outer surface 2502 and diameter 2504. In this illustrative example, diameter 2504 may be smaller than the width of base 2100.

Figure 26:
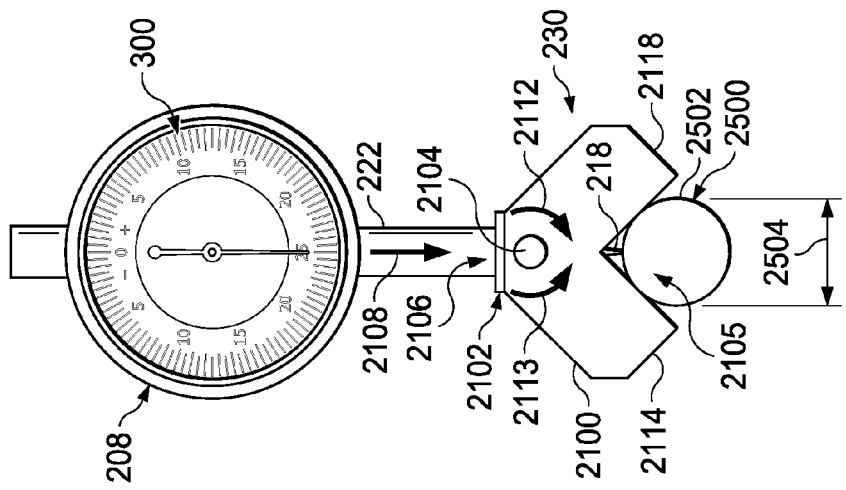
FIG. 26 is an illustration of a side view of an indicator, with a tip attached to a probe, being stabilized by a fourth stability device relative to a cylindrical object in accordance with an illustrative embodiment.

With reference now to FIG. 26, an illustration of a side view of indicator 268, with tip 218 attached to probe 222, being stabilized by fourth stability device 230 relative to cylindrical object 2500 from FIG. 25 is depicted in accordance with an illustrative embodiment. In this illustrative example, a side view of indicator 208, with tip 218 attached to probe 222, being stabilized by fourth stability device 230 relative to curved outer surface 2502 of cylindrical object 2500 is depicted taken with respect to lines 26-26 in FIG. 25.

Figure 27:
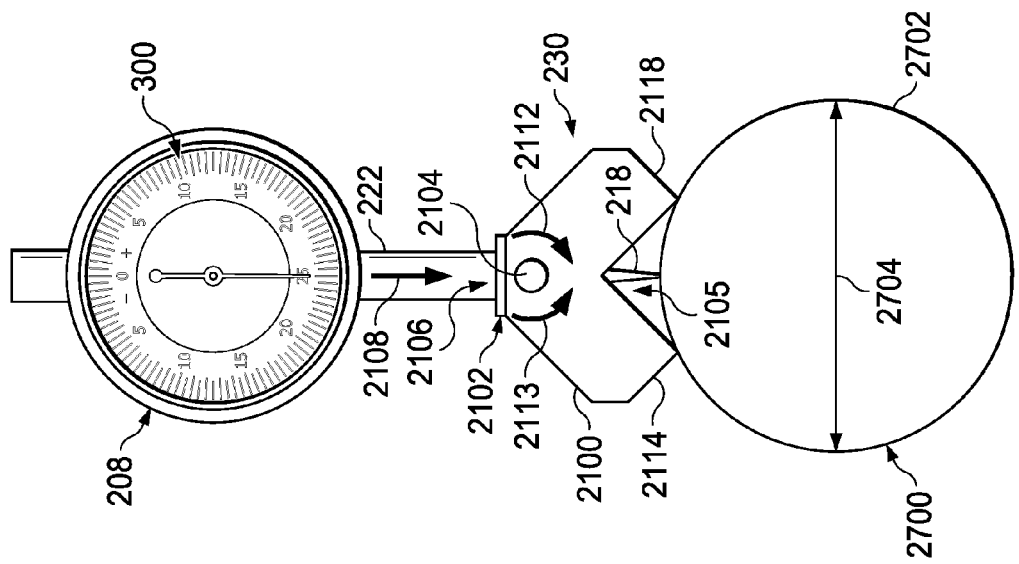
FIG. 27 is an illustration of a side view of an indicator, with a tip attached to a probe, being stabilized by a fourth stability device over a cylindrical object in accordance with an illustrative embodiment.

With reference now to FIG. 27, an illustration of a side view of indicator 208, with tip 218 attached to probe 222, being stabilized by fourth stability device 230 over a cylindrical object is depicted in accordance with an illustrative embodiment. In this illustrative example, fourth stability device 230 may stabilize probe 222 of indicator 208 with tip 218 attached to probe 222 over cylindrical object 2700.

Cylindrical object 2700 may have curved outer surface 2702 and diameter 2704. In this illustrative example, diameter 2704 may be greater than the width of base 2100. Further, diameter 2704 may be greater than diameter 2504 in FIG. 25.

Figure 28:
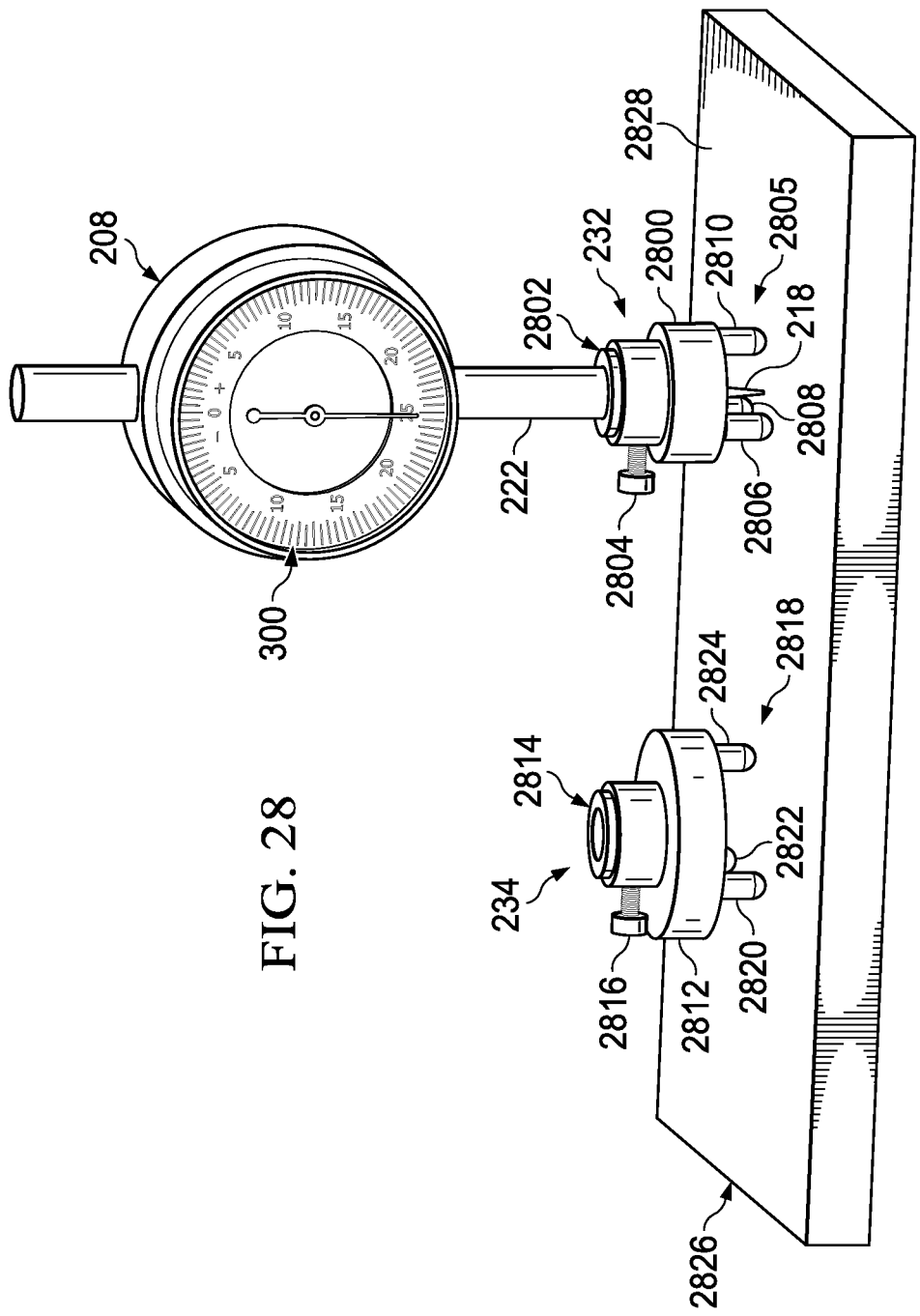
FIG. 28 is an illustration of an isometric view of a fifth stability device and a sixth stability device positioned over an object in accordance with an illustrative embodiment.

With reference now to FIG. 28, an illustration of an isometric view of fifth stability device 232 and sixth stability device 234 positioned over an object is depicted in accordance with an illustrative embodiment. Fifth stability device 232 and sixth stability device 234 may be seen in FIG. 28. Fifth stability device 232 may be used to secure probe 222 and tip 218 in this illustrative example.

As depicted, fifth stability device 232 may include base 2800, retaining structure 2802, adjustment member 2804, and stabilizing feature 2805. Stabilizing feature 2805 may include members 2806, 2808, and 2810. Further, sixth stability device 234 may include base 2812, retaining structure 2814, adjustment member 2816, and stabilizing feature 2818. Stabilizing feature 2818 may include members 2820, 2822, and 2824. Adjustment member 2804 may be a threaded fastener in this illustrative example.

In this illustrative example, fifth stability device 232 and sixth stability device 234 may be positioned over object 2826. Object 2826 may have surface 2828 that is substantially flat.

The illustrations in FIGS. 2-28 are not meant to imply physical or architectural limitations to the manner in which an illustrative embodiment may be implemented. Other components in addition to or in place of the ones illustrated may be used. Some components may be optional.

The different components shown in FIGS. 2-28 may be illustrative examples of how components shown in block form in FIG. 1 can be implemented as physical structures. Additionally, some of the components in FIGS. 2-28 may be combined with components in FIG. 1, used with components in FIG. 1, or a combination of the two.

Figure 29:
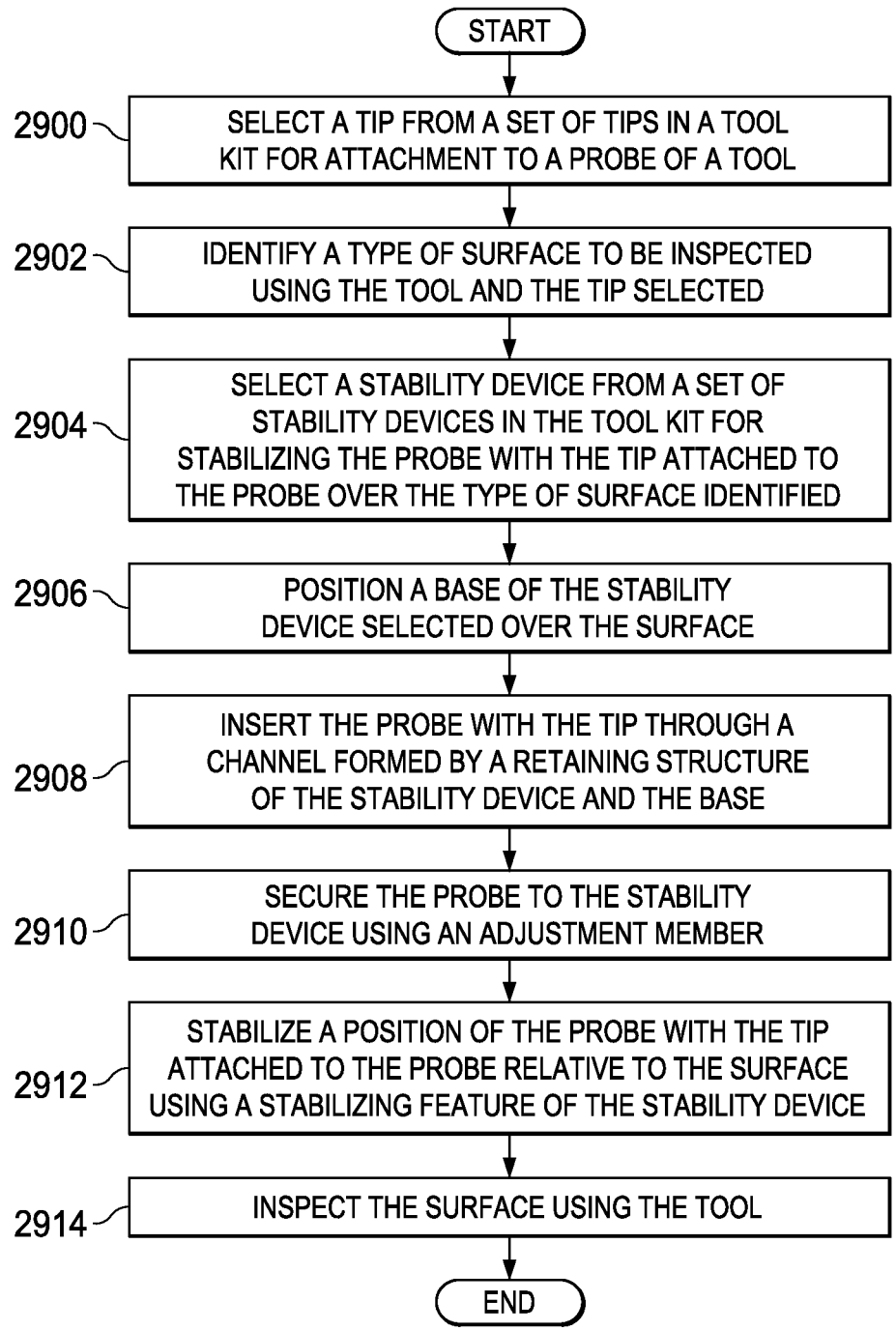
FIG. 29 is an illustration of a process for inspecting a surface of an object in the form of a flowchart in accordance with an illustrative embodiment.

With reference now to FIG. 29, an illustration of a process for inspecting a surface of an object is depicted in the form of a flowchart in accordance with an illustrative embodiment. The process illustrated in FIG. 29 may be implemented using tool kit 100 in FIG. 1.

The process may begin by selecting a tip from a set of tips in a tool kit for attachment to a probe of a tool (operation 2900). A type of surface to be inspected using the tool and the tip selected may be identified (operation 2902). A stability device may be selected from a set of stability devices in the tool kit for stabilizing the probe with the tip attached to the probe over the type of surface identified (operation 2904).

Next, a base of the stability device selected may be positioned over the surface (operation 2906). The probe with the tip may be inserted through a channel formed by a retaining structure of the stability device and the base (operation 2908). The probe may be secured to the stability device using an adjustment member (operation 2910).

Thereafter, a position of the probe with the tip attached to the probe relative to the surface may be stabilized using a stabilizing feature of the stability device (operation 2912). The surface may then be inspected using the tool (operation 2914), with the process terminating thereafter.

Illustrative embodiments of the disclosure may be described in the context of aircraft manufacturing and service method 3000 as shown in FIG. 30 and aircraft 3100 as shown in FIG. 31. Turning first to FIG. 30, an illustration of an aircraft manufacturing and service method is depicted in the form of a block diagram in accordance with an illustrative embodiment. During pre-production, aircraft manufacturing and service method 3000 may include specification and design 3002 of aircraft 3100 in FIG. 31 and material procurement 3004.

During production, component and subassembly manufacturing 3006 and system integration 3008 of aircraft 3100 in FIG. 31 takes place. Thereafter, aircraft 3100 in FIG. 31 may go through certification and delivery 3010 in order to be placed in service 3012. While in service 3012 by a customer, aircraft 3100 in FIG. 31 is scheduled for routine maintenance and service 3014, which may include modification, reconfiguration, refurbishment, and other maintenance or service.

Each of the processes of aircraft manufacturing and service method 3000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 31, an illustration of an aircraft is depicted in the form of a block diagram in which an illustrative embodiment may be implemented. In this example, aircraft 3100 is produced by aircraft manufacturing and service method 3000 in FIG. 30 and may include airframe 3102 with plurality of systems 3104 and interior 3106. Examples of systems 3104 include one or more of propulsion system 3108, electrical system 3110, hydraulic system 3112, and environmental system 3114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3000 in FIG. 30. In particular, set of stability devices 114 in tool kit 100 from FIG. 1 may be used to stabilize tools during any one of the stages of aircraft manufacturing and service method 3000. For example, without limitation, set of stability devices 114 from FIG. 1 may be used to stabilize tools relative to the surfaces of objects during at least one of component and subassembly manufacturing 3006, system integration 3008, routine maintenance and service 3014, or some other stage of aircraft manufacturing and service method 3000.

In one illustrative example, components or subassemblies produced in component and subassembly manufacturing 3006 in FIG. 30 may be fabricated or manufactured in a manner similar to components or subassemblies produced while aircraft 3100 is in service 3012 in FIG. 30. As yet another example, one or more apparatus embodiments, method embodiments, or a combination thereof may be utilized during production stages, such as component and subassembly manufacturing 3006 and system integration 3008 in FIG. 30. One or more apparatus embodiments, method embodiments, or a combination thereof may be utilized while aircraft 3100 is in service 3012 and/or during maintenance and service 3014 in FIG. 30. The use of a number of the different illustrative embodiments may substantially expedite the assembly of and/or reduce the cost of aircraft 3100.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting a surface using a device, the device comprising a cylindrical retaining structure through which an inspection tool is disposed; a frusto-conical base extending from the cylindrical retaining structure, wherein a side of the frusto-conical base opposite the cylindrical retaining structure is substantially flat with a circular open shape, and wherein windows are disposed in a wall of the frusto-conical base, the method comprising:
   stabilizing the inspection tool against a substantially flat workpiece by placing the side of the frusto-conical base against the flat workpiece; and
   inspecting the surface using the inspection tool.

2. The method of claim 1, further comprising:
   securing the inspection tool to the cylindrical retaining structure using an adjustment member connected to the cylindrical retaining structure.

3. The method of claim 2, wherein the adjustment member comprises a threaded screw disposed through a wall of the cylindrical retaining structure, and wherein the method further comprises:
   tightening the screw against a shaft of the inspection tool.

4. The method of claim 1, wherein inspecting the surface comprises moving the side of the frusto-conical base along the surface.

5. The method of claim 1, wherein the tool comprises a depth indicator and wherein inspecting the surface comprises:
   taking a plurality of measurements of depths along the surface.

6. A method for inspecting a workpiece using a device, the device comprising a retaining structure having a first hole and a second hole, wherein an inspection tool is disposed through the first hole, wherein the second hole provides a viewing area through the retaining structure to view a surface of a workpiece, wherein the retaining structure has a first side and a second side opposite the first side, wherein a plurality of members extend from the second side, wherein the plurality of members are adjacent the second hole but not the first hole, wherein the workpiece comprises a two level workpiece with a first section higher than a second section, wherein the first section and the second section have surfaces that are substantially flat, and wherein the method comprises:
   stabilizing the device by placing the plurality of members on a first surface of the first section of the workpiece; and
   inspecting the second section by moving the plurality of members over the first surface of the first section of the workpiece to cause the tool to move over a second surface of the second section of the workpiece.

7. The method of claim 6 further comprising:
   securing the inspection tool to the retaining structure using an adjustment member connected to the retaining structure.

8. The method of claim 7, wherein the adjustment member comprises a threaded screw disposed through a wall of the retaining structure and into the first hole, and wherein the method further comprises:
   tightening the screw against a shaft of the inspection tool.

9. The method of claim 6, wherein the inspection tool comprises a depth indicator and wherein inspecting the surface comprises:
   taking a plurality of measurements of depths along the second surface.

10. The method of claim 6, wherein the inspection tool comprises a probe and wherein inspecting the surface comprises:
    probing the second surface.

11. A method for inspecting a cornered workpiece having a first corner side, a second corner side, and a corner angle, the method using a device, the device comprising a base having a first side, a second side opposite the first side, a third side connecting the first side and the second side at a first angle, and a fourth side connecting the first side and a second side at a second angle, the fourth side opposite the third side, wherein a fixed stabilizing feature extends from the fourth side, wherein a second stabilizing feature adjustably extends from the third side, wherein an inspection window comprising a first hole is disposed through the first side and the fourth side, wherein a second hole is disposed through the first side and the second side, wherein an inspection tool is disposed through the second hole, and wherein the method comprises:

placing the fixed stabilizing feature against the first cornered side;

placing the second stabilizing feature against the second cornered side, wherein after placing the fixed stabilizing feature and the second stabilizing feature, the second side faces a surface of the corner angle;

placing the inspection tool against the surface of the corner angle; and inspecting the surface using the inspection tool.

12. The method of claim 11 further comprising:

securing the inspection tool to the base using an adjustment member connected to a fifth side of the base.

13. The method of claim 12, wherein the adjustment member comprises a threaded screw disposed through a wall of the fifth side and into the second hole, and wherein the method further comprises:

tightening the screw against a shaft of the inspection tool.

14. The method of claim 11, wherein the inspection tool comprises a depth indicator and wherein inspecting the surface comprises:

taking a plurality of measurements of depths along the surface.

15. The method of claim 11, wherein the inspection tool comprises a probe and wherein inspecting the surface comprises:

probing the surface.

16. A method for inspecting a surface of a workpiece that has either an obtuse angle or a rounded surface, the method using a stability device, the stability device comprising an inverted Y shape, a first hole extending from a base of the inverted Y shape through the stability device, an inspection window comprising a second hole through a first branch of the Y shape through the stability device, and an inspection tool disposed through the first hole and into an area between the first branch and a second branch of the Y shape, and wherein the method comprises:

placing the area between the first branch and the second branch of the Y shape over the obtuse angle or the rounded surface;

placing the inspection tool over the surface; and inspecting the surface using the inspection tool.

17. The method of claim 16 further comprising:

securing the inspection tool to the stability device using an adjustment member connected to a side of the stability device.

18. The method of claim 17, wherein the adjustment member comprises a threaded screw, and wherein the method further comprises:

tightening the screw against a shaft of the inspection tool.

19. The method of claim 16, wherein the inspection tool comprises a depth indicator and wherein inspecting the surface comprises:

taking a plurality of measurements of depths along the surface.

20. The method of claim 16, wherein the inspection tool comprises a probe and wherein inspecting the surface comprises:

probing the surface.

21. A method for inspecting a surface of a workpiece using a device, the device comprising a first cylindrical retaining structure having a first side and a second side opposite the first side the device further comprising a second cylindrical retaining structure having a third side and a fourth side opposite the third side, wherein the third side is attached to the second side, wherein a first radius of the first cylindrical retaining structure is less than a second radius of the second cylindrical retaining structure, wherein a plurality of stabilizing members extend from the fourth side of the second cylindrical retaining structure, wherein a hole extends through the first side, second side, third side, and fourth side, wherein an inspection tool is disposed through the hole, and wherein the method comprises:

stabilizing the inspection tool against the workpiece by placing the plurality of stabilizing members against the surface of the workpiece;

placing the inspection tool over the surface; and inspecting the surface using the inspection tool.

22. The method of claim 21 further comprising:

securing the inspection tool to the first cylindrical retaining structure using an adjustment member connected to a side of the first cylindrical retaining structure.

23. The method of claim 22, wherein the adjustment member comprises a threaded screw, and wherein the method further comprises:

tightening the screw against a shaft of the inspection tool.

24. The method of claim 21, wherein the inspection tool comprises a depth indicator and wherein inspecting the surface comprises:

taking a plurality of measurements of depths along the surface.

25. The method of claim 21, wherein the inspection tool comprises a probe and wherein inspecting the surface comprises:

probing the surface.

\* \* \* \* \*